US012354334B2

United States Patent
Narayanan et al.

(10) Patent No.: US 12,354,334 B2
(45) Date of Patent: Jul. 8, 2025

(54) ADAPTIVE REGION-BASED OBJECT SAMPLING FOR OBJECT DETECTION

(71) Applicant: QUALCOMM Incorporated, San Diego, CA (US)

(72) Inventors: Venkatraman Narayanan, Farmington Hills, MI (US); Varun Ravi Kumar, San Diego, CA (US); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 18/186,003

(22) Filed: Mar. 17, 2023

(65) Prior Publication Data
US 2024/0312188 A1    Sep. 19, 2024

(51) Int. Cl.
*G06V 10/774*  (2022.01)
*G06T 15/20*  (2011.01)
*G06T 17/00*  (2006.01)
*G06V 10/776*  (2022.01)
*G06V 20/64*  (2022.01)

(52) U.S. Cl.
CPC ............ *G06V 10/774* (2022.01); *G06T 15/20* (2013.01); *G06T 17/00* (2013.01); *G06V 10/776* (2022.01); *G06V 20/64* (2022.01); *G06T 2210/56* (2013.01)

(58) Field of Classification Search
None
See application file for complete search history.

(56) References Cited

U.S. PATENT DOCUMENTS

| | | |
|---|---|---|
| 11,574,462 B1 | 2/2023 | Bhatia et al. |
| 2018/0364717 A1 | 12/2018 | Douillard et al. |
| 2020/0210715 A1 | 7/2020 | Golomedov et al. |
| 2021/0025989 A1 | 1/2021 | Vallespi-Gonzalez et al. |
| 2021/0309248 A1 | 10/2021 | Choe et al. |
| 2022/0012916 A1 | 1/2022 | Srinivasan |
| 2022/0165043 A1 | 5/2022 | Rong et al. |
| 2022/0172495 A1 | 6/2022 | Sheu et al. |

(Continued)

OTHER PUBLICATIONS

Zhou, Y. and Tuzel, O., 2018. Voxelnet: End-to-end learning for point cloud based 3d object detection. In Proceedings of the IEEE conference on computer vision and pattern recognition (pp. 4490-4499) (Year: 2018).*

(Continued)

*Primary Examiner* — Edward Martello
(74) *Attorney, Agent, or Firm* — QUALCOMM Incorporated

(57) ABSTRACT

Systems and techniques are described herein for training an object-detection model. For instance, a method for training an object-detection model is provided. The method may include obtaining a light detection and ranging (LIDAR) capture; obtaining a first LIDAR-based representation of an object as captured from a first distance; obtaining a second LIDAR-based representation of the object as captured from a second distance; augmenting the LIDAR capture using the first LIDAR-based representation of the object and the second LIDAR-based representation of the object to generate an augmented LIDAR capture; and training a machine-learning object-detection model using the augmented LIDAR capture.

30 Claims, 8 Drawing Sheets

(56) References Cited

U.S. PATENT DOCUMENTS

2022/0262072 A1* 8/2022 Manivasagam ....... G01S 17/006

OTHER PUBLICATIONS

Guo, Y., Wang, H., Hu, Q., Liu, H., Liu, L. and Bennamoun, M., 2020. Deep learning for 3d point clouds: A survey. IEEE transactions on pattern analysis and machine intelligence, 43(12), pp. 4338-4364. (Year: 2020).*
International Search Report and Written Opinion—PCT/US2024/014486—ISA/EPO—Apr. 17, 2024.

* cited by examiner

ADAPTIVE REGION-BASED OBJECT SAMPLING FOR OBJECT DETECTION

TECHNICAL FIELD

The present disclosure generally relates to performing object detection. In some examples, aspects of the present disclosure are related to systems and techniques for adaptive region-based object sampling for object detection using a trained object-detection model (e.g., a light detection and ranging (LIDAR)-based object-detection machine-learning model) and for training the object-detection model.

BACKGROUND

A light detection and ranging (LIDAR) system scans (e.g., across azimuth and elevation) an environment using one or more lasers and calculates distances between the LIDAR system and objects in the environment based on laser light reflected by the objects (e.g., using a time-of-flight (TOF) or indirect time-of-flight technique). Data from a LIDAR system captured at a given time can be referred to herein as a "LIDAR capture." A LIDAR capture can include spatial data including three-dimensional coordinates (e.g., a point cloud) representing objects in the environment. The three-dimensional coordinates can be derived from the calculated distances between the LIDAR system and the objects at a number of respective azimuth and elevation angles.

Many devices and systems can detect objects in an environment by analyzing one or more LIDAR captures of the environment. Detecting objects can involve determining a position of the object relative to the LIDAR system that obtained the LIDAR capture of the environment. In some cases, detecting objects can include identifying or classifying the objects.

Some devices and systems can use a trained machine-learning model to perform object detection. For example, a machine-learning model can be trained using many LIDAR captures including objects and many corresponding annotations including information about the objects (e.g., location and classification information). Once trained, a machine-learning model can detect objects in an environment based on a LIDAR capture representative of the environment.

As an example, LIDAR-based object detection can be implemented in automated vehicles. For instance, an automated vehicle can include a LIDAR system that can obtain (e.g., at regular intervals) LIDAR captures. The automated vehicle can include a processor and a memory that can implement a trained machine-learning model to detect objects within the environment based on the LIDAR captures. The automated vehicle can use information regarding the detected objects when controlling the vehicle.

SUMMARY

Systems and techniques are described for training an object-detection model. According to at least one example, a method is provided for training an object-detection model. The method includes: obtaining a light detection and ranging (LIDAR) capture; obtaining a first LIDAR-based representation of an object as captured from a first distance; obtaining a second LIDAR-based representation of the object as captured from a second distance; augmenting the LIDAR capture using the first LIDAR-based representation of the object and the second LIDAR-based representation of the object to generate an augmented LIDAR capture; and training a machine-learning object-detection model using the augmented LIDAR capture.

In another example, an apparatus for training an object-detection model is provided that includes at least one memory and at least one processor (e.g., configured in circuitry) coupled to the at least one memory. The at least one processor configured to: obtain a light detection and ranging (LIDAR) capture; obtain a first LIDAR-based representation of an object as captured from a first distance; obtain a second LIDAR-based representation of the object as captured from a second distance; augment the LIDAR capture using the first LIDAR-based representation of the object and the second LIDAR-based representation of the object to generate an augmented LIDAR capture; and train a machine-learning object-detection model using the augmented LIDAR capture.

In another example, a non-transitory computer-readable medium is provided that has stored thereon instructions that, when executed by one or more processors, cause the one or more processors to: obtain a light detection and ranging (LIDAR) capture; obtain a first LIDAR-based representation of an object as captured from a first distance; obtain a second LIDAR-based representation of the object as captured from a second distance; augment the LIDAR capture using the first LIDAR-based representation of the object and the second LIDAR-based representation of the object to generate an augmented LIDAR capture; and train a machine-learning object-detection model using the augmented LIDAR capture.

In another example, an apparatus for training an object-detection model is provided. The apparatus includes: means for obtaining a light detection and ranging (LIDAR) capture; means for obtaining a first LIDAR-based representation of an object as captured from a first distance; means for obtaining a second LIDAR-based representation of the object as captured from a second distance; means for augmenting the LIDAR capture using the first LIDAR-based representation of the object and the second LIDAR-based representation of the object to generate an augmented LIDAR capture; and means for training a machine-learning object-detection model using the augmented LIDAR capture.

In some aspects, one or more of the apparatuses described herein is, is part of, and/or includes a vehicle or a computing system, device, or component of a vehicle, a robot, a drone, a mobile device (e.g., a mobile telephone and/or mobile handset and/or so-called "smartphone" or other mobile device), an extended reality (XR) device (e.g., a virtual reality (VR) device, an augmented reality (AR) device, or a mixed reality (MR) device), a head-mounted device (HMD) device, a wearable device (e.g., a network-connected watch or other wearable device), a wireless communication device, a camera, a personal computer, a laptop computer, a server computer, another device, or a combination thereof. In some aspects, the apparatus includes a LIDAR system or multiple LIDAR systems for capturing one or more LIDAR captures.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Training datasets (e.g., including light ranging and detection (LIDAR) captures and corresponding annotations) can be used to train LIDAR-based object-detection machine-learning models. Many existing training datasets that include LIDAR captures of environments may have relatively few, if any, objects at far distances (e.g., 100 meters or more) from the capturing LIDAR system. As noted previously, a LIDAR capture can include spatial data including three-dimensional coordinates (e.g., a point cloud) representing objects in an environment.

Figure 1:
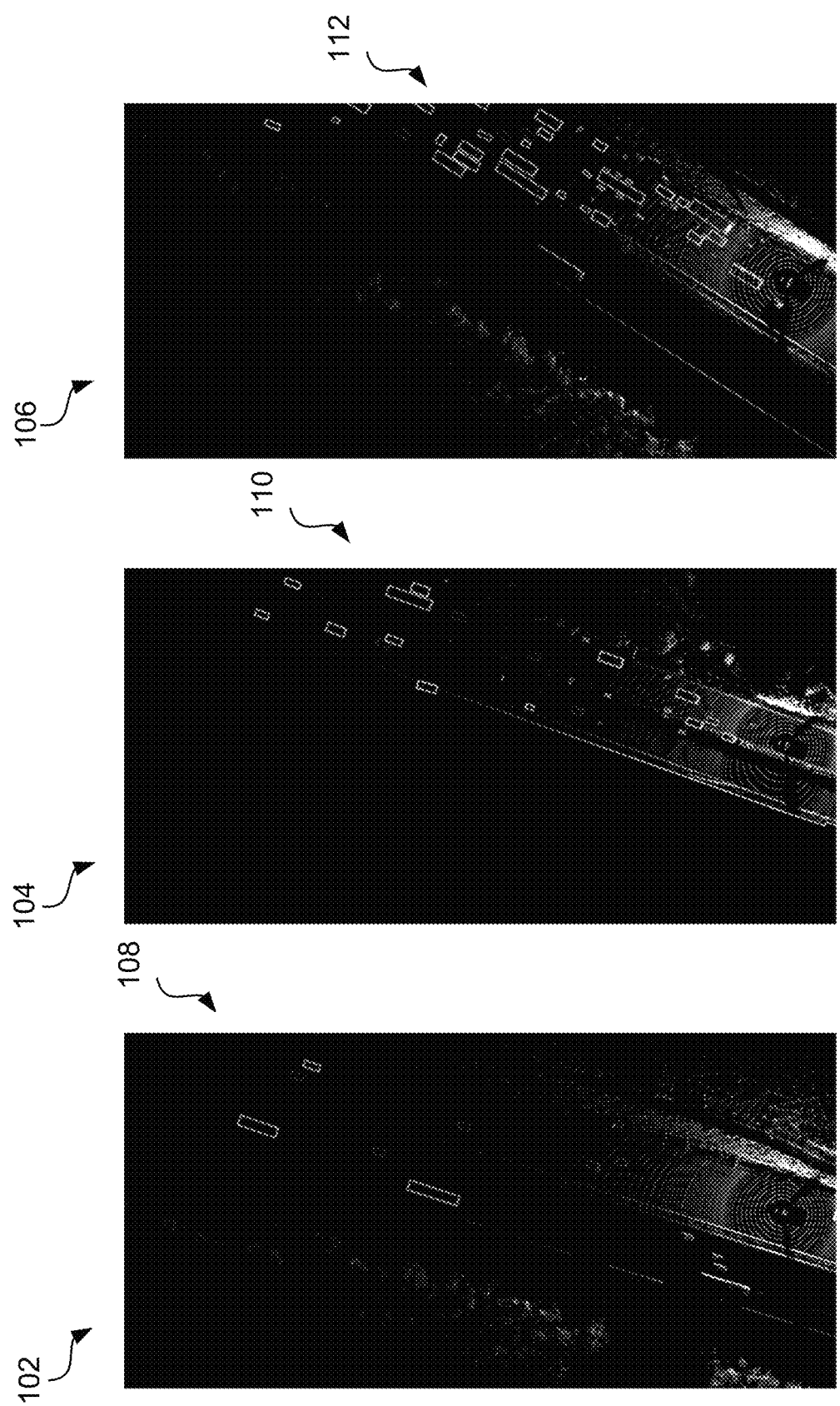
FIG. 1 includes three representations of three respective environments based on light detection and ranging (LIDAR) captures, according to various aspects of the present disclosure.

FIG. 1 includes three examples of representations (representation 102, representation 104, and representation 106) of three respective environments. Representation 102, representation 104, and representation 106 are based on respective LIDAR captures. Representation 104 and representation 106 may be based on LIDAR captures augmented according to various aspects disclosed herein.

Many training datasets include LIDAR captures of environments with few objects (e.g., fewer than five objects) that are more than a particular distance (e.g., more than 100 meters, 200 meters, etc.) from the capturing LIDAR system. As an example, representation 102 represents an environment simulated based on one or more LIDAR captures. The LIDAR captures on which representation 102 is based may be typical LIDAR captures of typical data sets, for example, including relatively few (e.g., fewer than five) objects 108 farther than the particular distance (e.g., 100 meters, etc.) from the LIDAR system that is used to capture the LIDAR captures. Objects 108 are illustrated using bounding boxes.

Generally, there is a scarcity of training datasets including LIDAR captures including objects that are distant from the capturing LIDAR system. LIDAR captures including few (e.g., fewer than five) objects distant from the capturing LIDAR system (e.g., farther than 100 meters from the capturing system) may be referred to herein as "sparse-at-distance LIDAR captures." Training object-detection machine-learning models using only, or mostly, sparse-at-distance LIDAR captures can ineffectively, and/or inefficiently, train an object-detection machine-learning model to detect distant objects. In contrast, LIDAR captures including several (e.g., more than five) objects distant from the capturing LIDAR system (e.g., more than 100 meters from the capturing system) may be referred to herein as "dense-at-distance LIDAR captures." For example, representation 104 represents an environment simulated based on one or more LIDAR captures augmented according to various aspects described herein. For example, the LIDAR captures may include LIDAR-based representations of several (e.g., more than five) objects 110 farther than 100 meters from the LIDAR system which captured the LIDAR captures. Objects 110 are illustrated using bounding boxes.

The present disclosure describes systems, apparatuses, methods (also referred to herein as processes), and computer-readable media (collectively referred to as "systems and techniques") for adaptive region-based object sampling for object detection using a trained object-detection machine-learning model (e.g., a LIDAR-based object-detection machine-learning model). In some cases, the systems and techniques can be used for training object-detection machine-learning models. For example, the systems and techniques can be used for training LIDAR-based object-detection machine-learning models. The systems and techniques described herein remedy the scarcity of dense-at-distance LIDAR captures by augmenting existing LIDAR captures (e.g., of sparse-at-distance LIDAR captures of existing training datasets) with LIDAR-based representations of objects at far distances (e.g., between 100 and 300 meters) from a capturing LIDAR system, allowing the systems and techniques to generate dense-at-distance LIDAR captures. The systems and techniques can train the object-detection machine-learning models using the dense-at-distance LIDAR captures, which trains the object-detection machine-learning models to detect distant objects. In some aspects, each of the object-detection machine-learning models described herein can include a neural network model.

In some aspects, the systems and techniques can train object-detection machine-learning models on a per-distance range, per-object, per-object-type, and/or per-orientation basis. For example, such as during backpropagation, the systems and techniques can calculate losses on a per-distance range, per-object, per-object-type, and/or per-orientation basis and adjust parameters (e.g., weights, biases, and/or other parameter) of the object-detection machine-learning model based on the calculated per-distance range, per-object, per-object-type, and/or per-orientation basis losses to improve performance of the object-detection machine-learning model on a per-distance range, per-object, per-object-type, and/or per-orientation basis. As an example, the machine-learning model may include a neural-network model and the systems and techniques may adjust parameters (e.g., weights) of the neural network to improve detection of distant objects. As another example, the systems and techniques may adjust the sizes of voxels at different distance ranges to improve per-distance range object detection. For example, through training, the object-detection machine-learning model may determine appropriate sizes for voxels at different distance ranges by adjusting the sizes through the backpropagation process. In the present disclosure, the term "voxel" may refer to an element of volume of a three-dimensional space. For example, a three-dimensional space may be divided into a number of voxels according to a three-dimensional grid.

Additionally or alternatively, the systems and techniques can adapt the augmentation of the augmented LIDAR captures by increasing or decreasing the number of simulated objects on a per-distance range, per-object-type, per-object, and/or per-orientation basis to improve training with respect to detecting objects on a per-distance range, per-object, per-object-type, and/or per-orientation basis. Referring to FIG. 1 as an illustrative example, representation 106 represents an environment simulated based on one or more LIDAR captures augmented according to various aspects described herein. For instance, the LIDAR captures may include LIDAR-based representations of several (e.g., more than five) objects 112 farther than a particular distance (e.g., 100 meters, 200 meters, 300 meters, etc.) from the LIDAR system that captured the LIDAR captures. Objects 112 are illustrated using bounding boxes. Further, LIDAR-based representations added to the LIDAR captures may be added on a per-distance range, per-object, per-object-type, and/or per-orientation basis. For example, the LIDAR-based representations may be added at various distance ranges in order to better train an object-detection machine-learning model to detect objects at the various distance ranges.

Various aspects of the systems and techniques are described herein and will be discussed with respect to the figures below.

Figure 2:
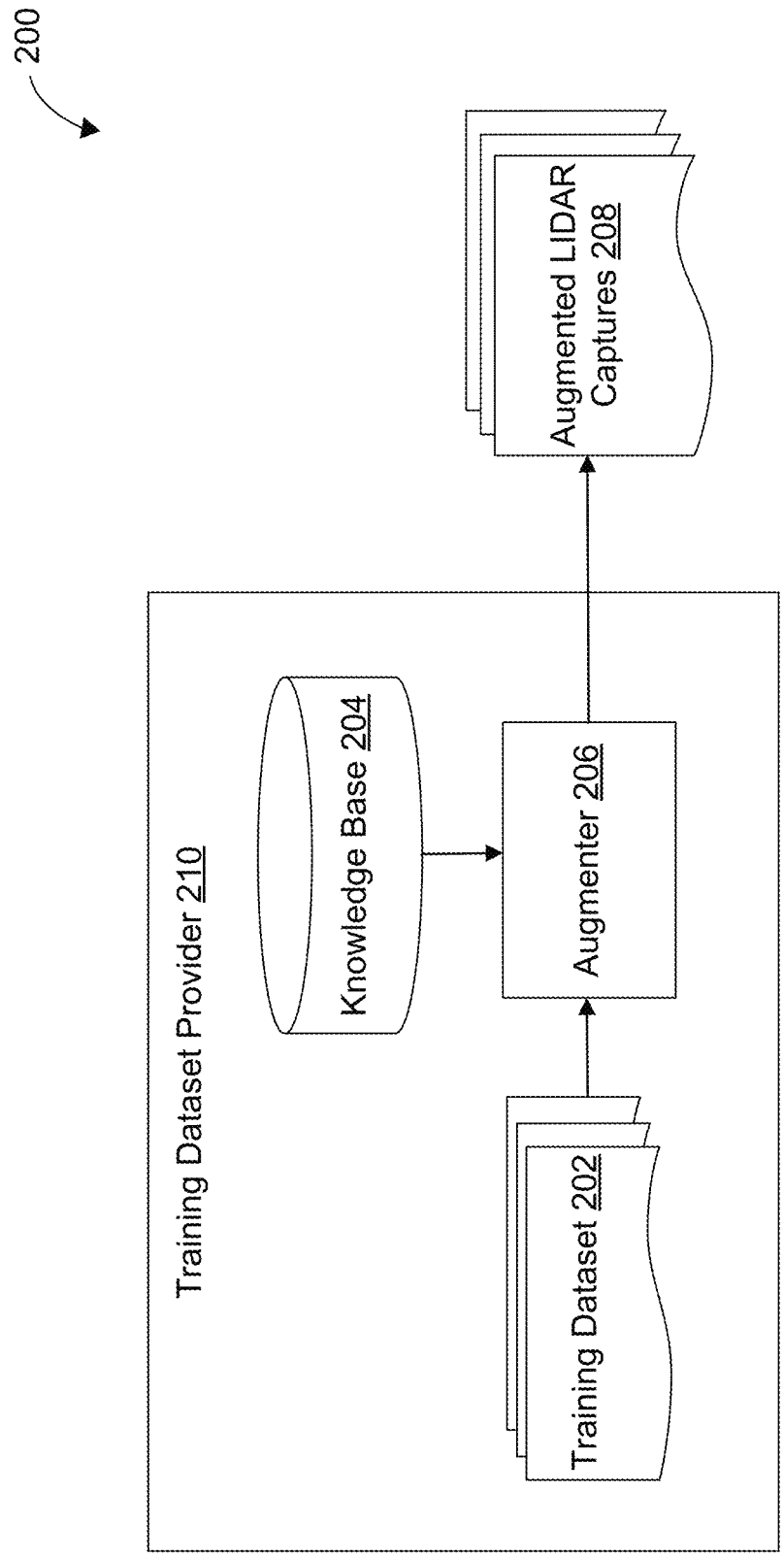
FIG. 2 is a block diagram illustrating an example system for augmenting training data, according to various aspects of the present disclosure.

FIG. 2 is a block diagram illustrating an example system 200 for augmenting training data, according to various aspects of the present disclosure. System 200 may obtain a training dataset 202, simulate LIDAR-based representations of objects based on data in a knowledge base 204, and augment LIDAR captures of training dataset 202 to generate augmented LIDAR captures 208. Training dataset 202, knowledge base 204, and augmenter 206 may be included in, or be collectively referred to as, a training dataset provider 210.

Training dataset 202 may include multiple LIDAR captures. The LIDAR captures may be of the same scene (e.g., at different times) or of multiple different respective scenes. The LIDAR captures may, or may not, include multiple objects. The objects may be at a variety of distances from a LIDAR system which captures the LIDAR captures. The LIDAR captures may include actual captured LIDAR captures and/or simulated LIDAR captures (e.g, a simulated LIDAR capture of a simulated environment including simulated objects). The LIDAR captures may be, or may include, point clouds.

Knowledge base 204 may include data representative of objects, for example, knowledge base 204 may include three-dimensional models of multiple different objects. As an example, knowledge base 204 may include point-cloud representations of objects, such as varieties of cars, trucks, trees, bicyclists, and pedestrians. The three-dimensional models may be based on actual LIDAR captures (e.g., a model may be generated based on one or more LIDAR captures of an object). Alternatively, the three-dimensional models may be computer-generated. In some cases, knowledge base 204 may include data representative of object stratified by distance range.

Augmenter 206 can use data from knowledge base 204 to generate LIDAR-based representations of one or more objects and to augment LIDAR captures of training dataset 202 with the LIDAR-based representations. Augmenter 206 can generate LIDAR-based representations of an object (which can be visualized as being captured from a number of viewing angles, such as a front view or side view), as captured at a number of azimuth angles, as captured from a number of elevation angles, as captured from a number of distances, and/or as captured by a number of different LIDAR systems.

In some aspects, to augment the LIDAR captures of training dataset 202, augmenter 206 can simulate a three-dimensional environment including a simulated LIDAR-capture system. Augmenter 206 can post-process the LIDAR captures in training dataset 202 to generate point-cloud data that includes 3D points (occupancy) in space. Augmenter 206 can place simulated objects in this space. For instance, augmenter 206 can position and orient a 3D model of an object within the simulated three-dimensional environment. In some cases, augmenter 206 can position the 3D model at one of any number of distances from the simulated LIDAR-capture system. Augmenter 206 can orient the model according to one of any number of different orientations. Based on positioning and orienting the model within the simulated three-dimensional environment, system 200 may simulate capturing a LIDAR capture of the model of the object at the LIDAR-capture system.

In one illustrative example, augmenter 206 can generate ten LIDAR-based representations of an object (e.g., a car, a tree, or a person), with each LIDAR-based representation representing the object at a different location (e.g., distance, azimuth, and/or elevation relative to a LIDAR system) within the environment and having a different orientation.

Augmenter 206 can augment LIDAR captures of training dataset 202 by adding LIDAR-based representations of objects at different distances (e.g., at far distances, such as more than 100 meters from the capturing LIDAR system) (the LIDAR-based representations based on knowledge base 204) into the LIDAR captures of training dataset 202. The added LIDAR-based representations can include any number of different objects, at any number of different locations within the environment, and as viewed from any number of different viewing angles. When adding the LIDAR-based representations, augmenter 206 can simulate the environment to place the LIDAR-based representations at an elevation angle and an azimuth angle that correspond to the location within the environment from which the LIDAR-based representations are simulated to have been captured.

Further, in some aspects, augmenter 206 can prevent objects represented by the added LIDAR-based representations from overlapping with one another and/or with objects already in the LIDAR captures. The systems and techniques can, in some instances, limit an amount of occlusion of added LIDAR-based representations by other objects (e.g., including by objects in the LIDAR captures and by objects represented by added LIDAR-based representations). For example, augmenter 206 may add a number LIDAR-based representations into a LIDAR capture, then determine whether an overlap or unwanted occlusion has occurred. Responsive to an overlap or unwanted occlusion, augmenter 206 may remove a LIDAR-based representation. As another example, augmenter 206 may simulate the environment and locations where LIDAR-based representations may be added. Augmenter 206 may determine to add LIDAR-based representations in locations within the simulated environment that will not overlap (or cause an unwanted occlusion) with objects in the LIDAR capture (either objects already in the LIDAR capture as received from training dataset 202 or LIDAR-based representations of objects added to the LIDAR capture by augmenter 206).

In some instances, augmenter 206 may randomly select which LIDAR-based representations to add, how many LIDAR-based representations to add, where to add the LIDAR-based representations, the orientations of the LIDAR-based representations, etc. In some cases, rules that describes selection and placement of LIDAR-based representations may be provided and augmenter 206 may augmented LIDAR captures according to the rules.

Figure 3:
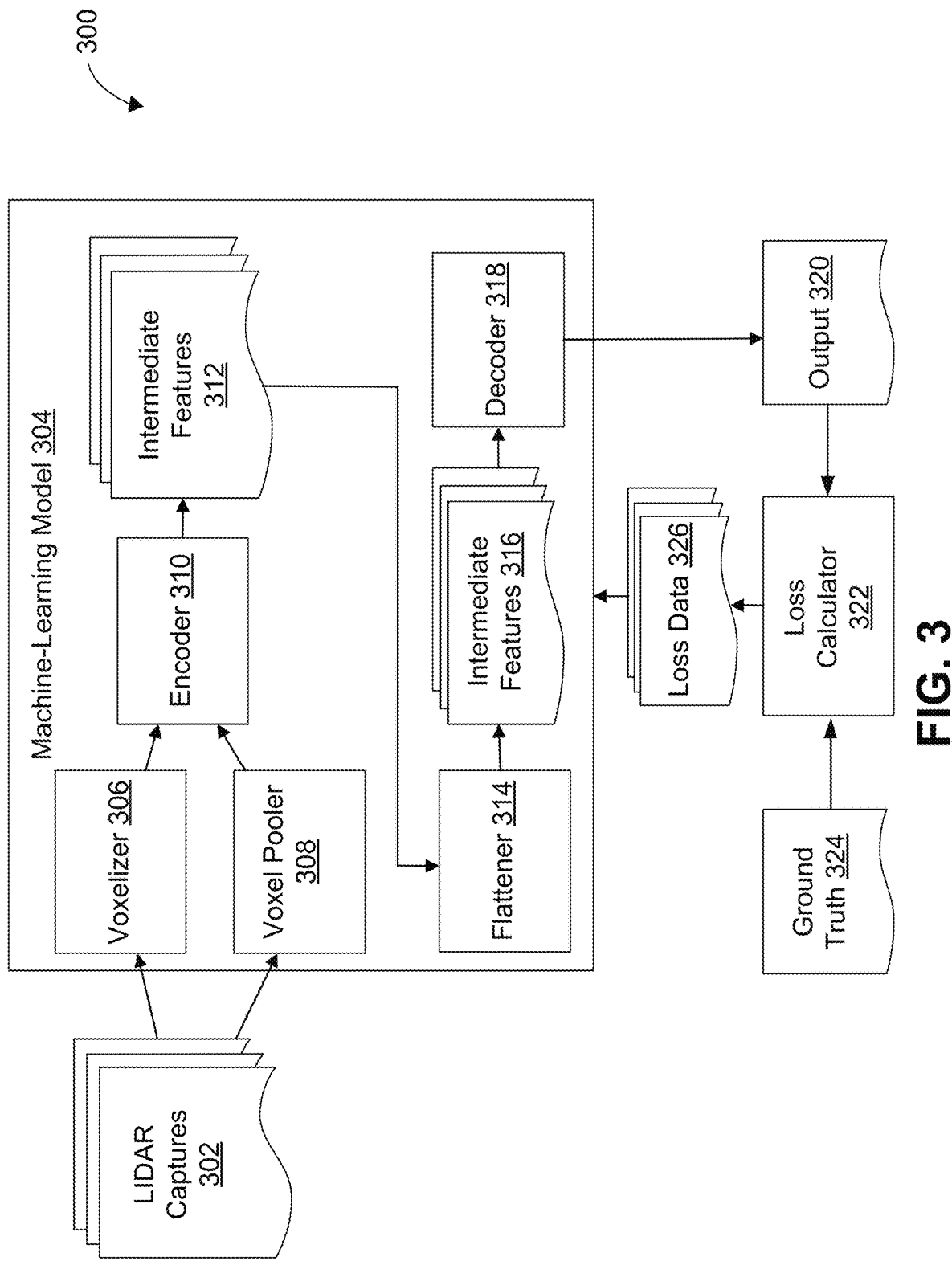
FIG. 3 is a block diagram illustrating an example system for training a machine-learning model, according to various aspects of the present disclosure.

FIG. 3 is a block diagram illustrating an example system 300 for training a machine-learning model 304, according to various aspects of the present disclosure. System 300 may train machine-learning model 304 through a backpropagation process including providing LIDAR captures 302 to machine-learning model 304, receiving output 320 from machine-learning model 304, providing output 320 and ground truth 324 to loss calculator 322, and adjusting parameters of machine-learning model 304 according to loss data 326 determined by loss calculator 322. By training the machine-learning model 304 using augmented LIDAR captures (e.g., where LIDAR captures 302 are, or include, augmented LIDAR captures 208 of FIG. 2), system 300 may better train the machine-learning model 304 to detect distant objects than other machine-learning-model-training techniques. Additionally, the backpropagation process may include training machine-learning model 304 on a per-distance range, per-object, per-object-type, and/or per-orientation basis to adjust parameters of machine-learning model 304 to improve the performance of machine-learning model 304 on a per-distance range, per-object, per-object-type, and/or per-orientation basis.

During an inference phase of operation, machine-learning model 304 may receive LIDAR captures 302 (e.g., captured live by a LIDAR system of an automobile or robot) and generate output 320 based on the received LIDAR captures 302. During a training phase of operation, machine-learning model 304 may, according to a backpropagation process, receive LIDAR captures 302 (which may be from a training dataset, or which may be augmented LIDAR captures, e.g., augmented LIDAR captures 208), generate output 320 based on the received LIDAR captures 302, receive loss data 326 from loss calculator 322, and adjust parameters of machine-learning model 304 to decrease loss in further iterations of the backpropagation process. Machine-learning model 304 may be, or may include, a neural-network model similar to or the same as neural network 600 as described with regard to FIG. 6, a neural-network model similar to or the same as convolutional neural network 700 as described with regard to FIG. 7, or using another type of neural-network model.

LIDAR captures 302 may, during an inference phase, be live LIDAR captures from an operating LIDAR system scanning an environment. LIDAR captures 302 may, during a training phase, be the same as, substantially similar to, or include, augmented LIDAR captures 208 or training dataset 202 of FIG. 2. LIDAR captures 302 may include a point-cloud representation of an environment.

Aside from adjusting parameters responsive to loss data 326, voxelizer 306, voxel pooler 308, flattener 314, and decoder 318 may operate in substantially the same way during the inference phase as during the training phase. Thus, the descriptions of operations of voxelizer 306, voxel pooler 308, flattener 314, and decoder 318 may pertain to operations of machine-learning model 304 during both the inference phase and the training phase.

Voxelizer 306 may receive LIDAR captures 302 and may discretize data of the LIDAR captures 302 into a number of three-dimensional voxels. For example, voxelizer 306 may discretize the point cloud of LIDAR captures 302 into a number of voxels, each voxel having a value (e.g., the value representing occupancy of the voxel) based a centroid of points of the point cloud corresponding to the voxel. Voxel pooler 308 may pool values of voxels to decrease a size of the voxel data.

Encoder 310 may include one or more interconnected layers of a neural network, including an input layer to receive the pooled voxel data. Encoder 310 may receive voxel data (e.g., values of voxel determined by voxelizer 306 and voxel pooler 308) and may generate intermediate features 312 based on the weights of the connections between the various nodes of the various layers.

Flattener 314 may receive intermediate features 312 and may flatten data of intermediate features 312 to generate intermediate features 316. For example, flattening of the data may result in the intermediate features 312 being transformed from a multi-dimensional (e.g., three-dimensional (3D)) representation to a two-dimensional (2D) (e.g., bird's eye view) representation (in which case the intermediate features 316 have the 2D representation).

Decoder 318 may include one or more interconnected layers of a neural network, including an output layer to provide output 320. Decoder 318 may receive intermediate features 316 and may generate output 320 based on the weights of the connections between the various nodes of the various layers.

Output 320 may include indications of objects detected in the received LIDAR captures.

For example, output 320 may include positions of bounding boxes (either two-dimensional or three-dimensional bounding boxes) relative to the LIDAR system which captured the LIDAR captures. Output 320 resulting from training data may be functionally the same as output 320 resulting from other (e.g., live) LIDAR captures.

Turning to a description of training machine-learning model 304 through the backpropagation process, ground truth 324 may include indications of positions of objects that are represented in LIDAR captures 302. Ground truth 324 may be provided to system 300 from a training-dataset provider (e.g., training dataset provider 210 of FIG. 2). In some instances, LIDAR captures 302 may include LIDAR-based representations generated by a LIDAR-data augmenter (e.g., augmenter 206 of FIG. 2). The training-dataset provider, having generated the LIDAR-based representations of the objects, may have information regarding the positions of the objects represented by the LIDAR-based representations, and may provide the information regarding the positions of the objects in ground truth 324. Additionally or alternatively, the training-dataset provider may have position information regarding objects in training dataset 202 (e.g., based on annotations). The training-dataset provider may provide the information regarding the positions of the objects in ground truth 324

Loss calculator 322 may compare output 320 to ground truth 324 and generate loss data 326 (e.g., object-detection-loss scores, focal loss scores, etc.) based on the comparison.

According to the backpropagation process, machine-learning model 304 may adjust parameters of machine-learning model 304 (e.g., weights, biases, etc.) based on loss data 326, e.g., to decrease (e.g., according to a gradient descent technique) loss data 326 of further iterations of the backpropagation process. As an example, decoder 318 may receive loss data 326 and update parameters (e.g., weights, biases, etc.) of decoder 318 based on loss data 326.

Loss calculator 322 may determine loss data 326 on a per-distance range, per-object, per-object-type, and/or per-orientation basis. For example, loss calculator 322 may compare output 320 to ground truth 324 on a per-distance range basis and may determine loss scores on a per-distance range basis. For instance, loss calculator 322 may determine a loss score for detecting objects in a 0 to 100 meters distance range, another loss score for detecting objects in a 100 to 200 meters distance range, and another loss score for detecting objects farther than 200 meters from the LIDAR system. The per-distance range loss scores may be indicative of how well machine-learning model 304 detects object at the various distance ranges.

As another example, loss calculator 322 may compare output 320 to ground truth 324 on a per-object-type basis and determine loss scores on a per-object-type basis. For instance, loss calculator 322 may determine a loss score for each of a number of object types (e.g., cars, trees, bicyclists, pedestrians, etc.). The loss scores for the number of object types may be indicative of how well machine-learning model 304 detects the various types of objects.

As yet another example, loss calculator 322 may compare output 320 to ground truth 324 on a per-object basis and determine loss scores on a per-object basis. For instance, loss calculator 322 may determine a loss score for each of a number of particular objects (e.g., a particular car as added to a number of LIDAR captures, a particular tree as added to a number of LIDAR captures, etc.). For example, a Lamborghini may have a small LIDAR profile and may be more difficult to detect than a Porsche. The loss scores for the number of objects may be indicative of how well machine-learning model 304 detects the various objects.

As another example, loss calculator 322 may compare output 320 to ground truth 324 on a per-orientation basis and determine loss scores on a per-orientation basis. For instance, loss calculator 322 may determine a loss score for an object at each of a number of orientations (e.g., front view of a car, a side view of the car, etc.). For example, a front-view of a car may have a smaller LIDAR profile and may be more difficult to detect than a side view of the car. The loss scores for the object at each of the number of orientations may be indicative of how well machine-learning model 304 detects the object at the various orientations.

System 300 may adjust parameters of machine-learning model 304 to improve loss data 326 on a per-distance range, per-object, per-object-type, and/or per-orientation basis. For example, system 300 may adjust parameters of machine-learning model 304 to improve how well machine-learning model 304 detects objects farther than 100 meters from the LIDAR system. In some cases, the system 300 can adjust weights and/or biases of the machine-learning model 304 (e.g., when implemented as a neural network model). Additionally or alternatively, sizes of voxels is an example of a parameter of machine-learning model 304 that may be adjusted. System 300 may adjust the sizes of voxels used by voxelizer 306 and/or voxel pooler 308 to improve the accuracy of object detection of machine-learning model 304. Further, system 300 may adjust the size of voxels on a per-distance range basis to improve the accuracy of object detection of machine-learning model 304 on a per-distance range basis. For example, system 300 may, through the backpropagation process, determine that machine-learning model 304 detects distant objects better if voxels more than 100 meters from the LIDAR system are smaller than voxels less than 100 meters from the LIDAR system.

Figure 4:
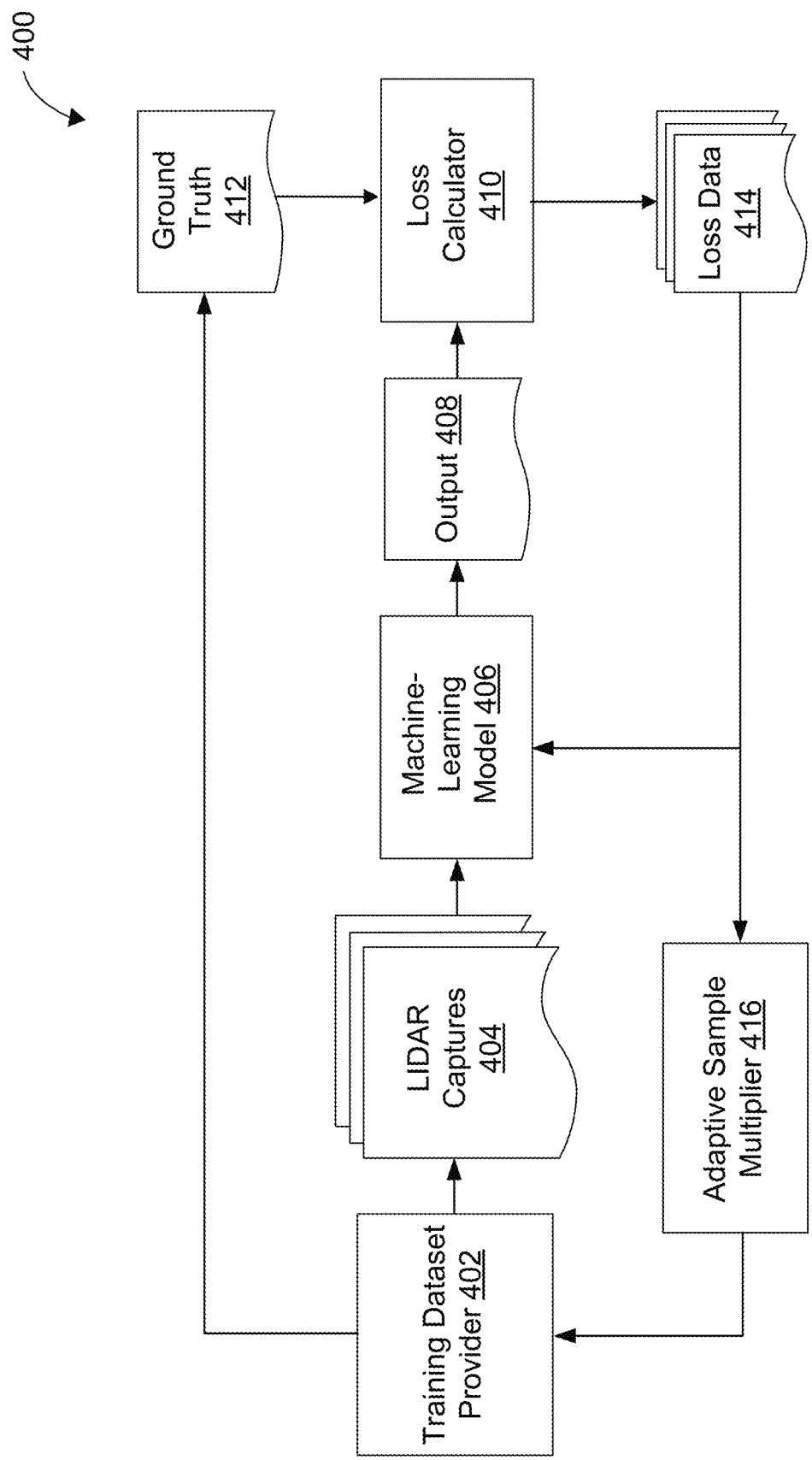
FIG. 4 is a block diagram illustrating another example system for training a machine-learning model, according to various aspects of the present disclosure.

FIG. 4 is a block diagram illustrating an example system 400 for training a machine-learning model 406, according to various aspects of the present disclosure. System 400 may train machine-learning model 406 through a backpropagation process involving adjusting parameters of machine-learning model 406 based on loss data 414 determined by loss calculator 410 based on a comparison between output 408 of machine-learning model 406 and ground truth 412. Additionally, system 400 may adaptively train machine-learning model 406 by selecting LIDAR captures 404 to use during training to improve the training of machine-learning model 406 on a per-distance range, per-object, per-object-type, and/or per-orientation basis.

Machine-learning model 406 may be the same as, substantially similar to, or operate the same as, or substantially similar to machine-learning model 304 of FIG. 3. Output 408 may be functionally the same as, or substantially similar to, output 320 of FIG. 3. Loss calculator 410 may be the same as, substantially similar to, or operate the same as, or substantially similar to, loss calculator 322 of FIG. 3. Ground truth 412 may be the same as, or substantially similar to, ground truth 324 of FIG. 3. Loss data 414 may be the same as, or substantially similar to, loss data 326 of FIG. 3.

Adaptive sample multiplier 416 may receive loss data 414 and may determine to adapt LIDAR captures 404 to improve training of machine-learning model 406 on a per-distance range, per-object, per-object-type, and/or per-orientation basis. For example, adaptive sample multiplier 416 may analyze loss data 414 and may determine that machine-learning model 406 could be improved with regard to a distance range, an object-type, an object, and/or an orientation.

Adaptive sample multiplier 416 may provide instructions to training dataset provider 402 to adapt LIDAR captures 404 by increasing or decreasing the number of objects added to LIDAR captures on a per-distance range, per-object, per-object-type, and/or per-orientation basis to improve the performance of machine-learning model 406 on a per-distance range, per-object, per-object-type, and/or per-orientation basis.

Adaptive sample multiplier 416 may include a machine-learning model, trained to improve training of machine-learning model 406 on a per-distance range, per-object, per-object-type, and/or per-orientation basis by selecting LIDAR captures 404. Adaptive sample multiplier 416 may be, or may include, a neural-network model similar to or the same as neural network 600 as described with regard to FIG. 6, a neural-network model similar to or the same as convolutional neural network 700 as described with regard to FIG. 7, or using another type of neural-network model. Adaptive sample multiplier 416 can be trained using a process similar to, or the same as, the process described with relation to training neural network 600 of FIG. 6. For example, the machine-learning model of adaptive sample multiplier 416 may take loss data 414 as an input and provide instructions regarding LIDAR captures 404 as output. The machine-learning model may be trained to decrease loss scores of loss data 414 on a per-distance range, per-object, per-object-type, and/or per-orientation basis through a backpropagation process.

Training dataset provider 402 may be the same as, substantially similar to, or operate the same as, or substantially similar to, training dataset provider 210 of FIG. 2. Additionally or alternatively, training dataset provider 402 may provide LIDAR captures 404 according to instructions regarding increasing or decreasing a number of objects in LIDAR captures 404 on a per-distance range, per-object, per-object-type, and/or per-orientation basis.

According to some aspects, training dataset provider 402 may respond to instructions from adaptive sample multiplier 416 (the instructions regarding increasing or decreasing LIDAR-based representations in LIDAR captures 404) by augmenting LIDAR captures 404 For example, training dataset provider 402 may add LIDAR-based representations to, or remove LIDAR-based representations from, existing LIDAR captures (including LIDAR captures of datasets (e.g., training dataset 202 of FIG. 2) or previously augmented LIDAR captures (e.g., augmented LIDAR captures 208)).

According to some aspects, training dataset provider 402 may select LIDAR captures 404 from an existing database of LIDAR captures that comply with the instructions provided by adaptive sample multiplier 416. For example, training dataset provider 402 may include a database including many LIDAR captures including a variety of objects, at a variety of distances, at a variety of orientations. Training dataset provider 402 may select LIDAR captures from the database and provide the selected LIDAR captures from the database to machine-learning model 406 responsive to the instructions from adaptive sample multiplier 416.

Figure 5:
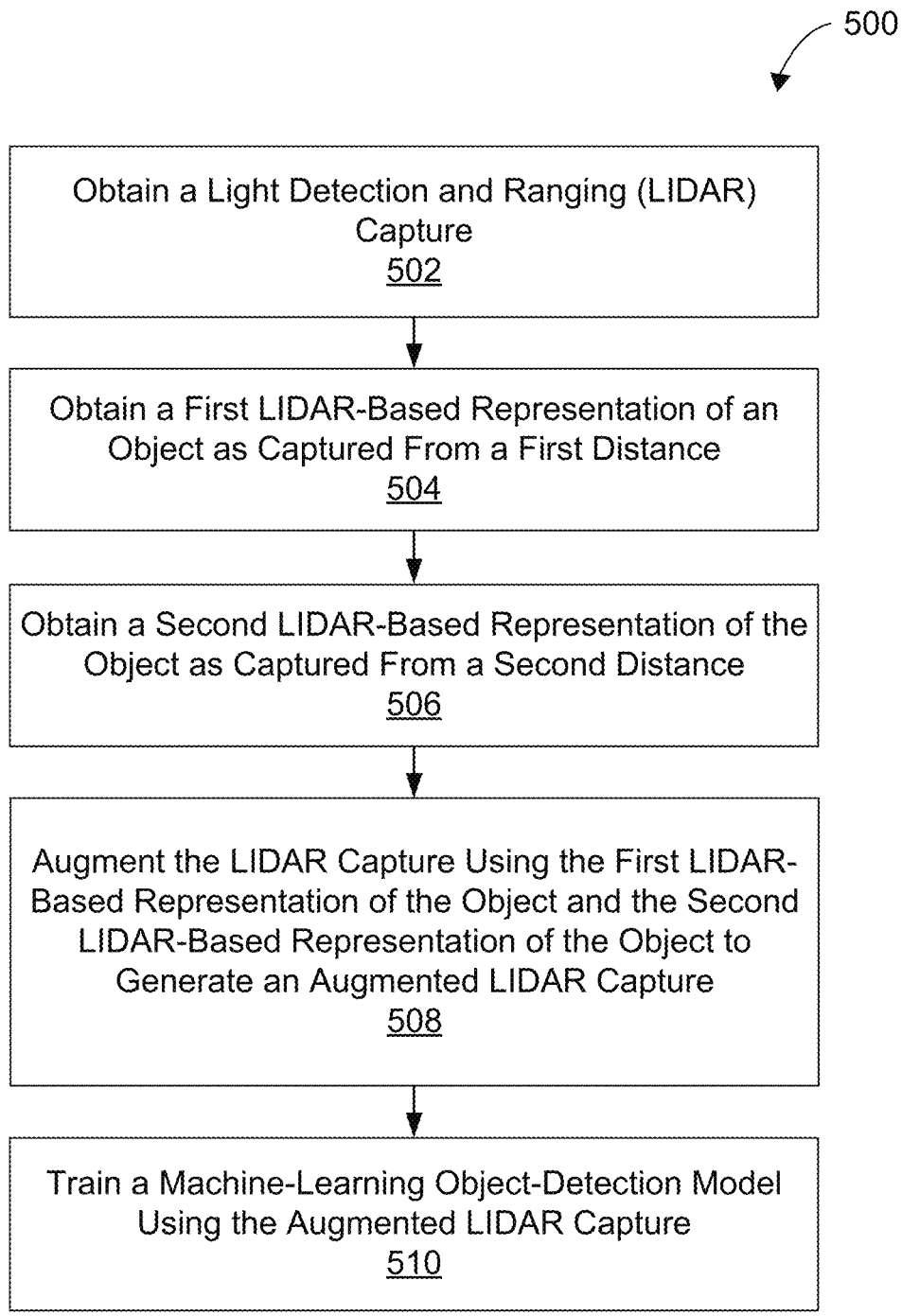
FIG. 5 is a flowchart illustrating an example of a method for training an object detection model, in accordance with various aspects of the present disclosure.

FIG. 5 illustrates an example of a process 500 for training an object-detection model, according to aspects of the according to various aspects of the present disclosure. The process 500 may be performed by a computing device (or apparatus) or a component (e.g., a chipset, one or more processors, etc.) of the computing device. The computing device may be a vehicle or a computing device of a vehicle, an extended reality (XR) device (e.g., a virtual reality (VR) device or augmented reality (AR) device), a mobile device (e.g., a mobile phone), a network-connected wearable such as a watch, and/or other type of computing device. The operations of the process 500 may be implemented as software components that are executed and run on one or more compute components or processors (e.g., processor 802 of FIG. 8, and/or other processor(s)). Transmission and reception of signals by the computing device in the process 500 may be enabled, for example, by one or more antennas, one or more transceivers (e.g., wireless transceiver(s)), and/or other communication components (e.g., the communication interface 826 of FIG. 8, or other antennae(s), transceiver(s), and/or component(s)).

At block 502, the computing device (or one or more components thereof) may obtain a light detection and ranging (LIDAR) capture. For example, training dataset provider 210 of FIG. 2 may obtain, or may include, training dataset 202, which may include one or more LIDAR captures.

At block 504, the computing device (or one or more components thereof) may obtain a first LIDAR-based representation of an object as captured from a first distance. For example, training dataset provider 210 may obtain, or may include, knowledge base 204, which may include one or more LIDAR-based representations of objects, including, the first LIDAR-based representation of the object as captured from the first distance.

At block 506, the computing device (or one or more components thereof) may obtain a second LIDAR-based representation of the object as captured from a second distance. For example, training dataset provider 210 may obtain, or may include, knowledge base 204, which may include one or more LIDAR-based representations of objects, including, the second LIDAR-based representation of the object as captured from the second distance.

At block 508, the computing device (or one or more components thereof) may augment the LIDAR capture using the first LIDAR-based representation of the object and the second LIDAR-based representation of the object to generate an augmented LIDAR capture. For example, augmenter 206 may augment one or more LIDAR captures (of block 502, e.g., of training dataset 202) with the first and second LIDAR-based representations (of block 504 and block 506, e.g., from knowledge base 204) to generate one or more of augmented LIDAR captures 208. In some aspects, the computing device (or one or more components thereof) may add the first LIDAR-based representation of the object (of block 504) and the second LIDAR-based representation of the object (of block 506) into the LIDAR capture (of block 502).

In some aspects, the computing device (or one or more components thereof) may obtain a model of the object, simulate a LIDAR capture of the model of the object from the first distance to generate the first LIDAR-based representation of the object, and simulate a LIDAR capture of the model of the object from the second distance to generate the second LIDAR-based representation of the object. For example, system 200 may obtain a model of an object (e.g., a point-cloud model) at training dataset 202. Augmenter 206 may simulate a LIDAR capture of the object at the first distance and the second distance by adding LIDAR-representations of the object to a LIDAR capture.

In some aspects, the computing device (or one or more components thereof) may simulate a three-dimensional environment including a simulated LIDAR-capture system; and position the model of the object within the simulated three-dimensional environment at a simulated first distance from the simulated LIDAR-capture system, the simulated first distance corresponding to the first distance. To simulate the LIDAR capture of the model of the object from the first distance, the computing device (or one or more components thereof) may simulate the LIDAR capture from the model of the object positioned within the three-dimensional environment at the simulated first distance from the LIDAR-capture system. For example, augmenter 206 may simulate a three-dimensional environment and add a model of an object to the three-dimensional environment a simulated first distance from a simulated LIDAR-capture system. System 200 may simulate a LIDAR capture from the simulated LIDAR-capture system. The model may be a point-cloud model of the object.

At block 510, the computing device (or one or more components thereof) may train a machine-learning object-detection model using the augmented LIDAR capture. For example, system 300 of FIG. 3 may train machine-learning model 304 using LIDAR captures 302, which may be, or may include, one or more of the augmented LIDAR captures of block 508. As another example, system 400 of FIG. 4 may train machine-learning model 406 using LIDAR captures 404, which may be, or may include, one or more of the augmented LIDAR captures of block 508.

In some aspects, the computing device (or one or more components thereof) may determine a first object-detection-loss score of the machine-learning object-detection model for the first LIDAR-based representation of the object; determine a second object-detection-loss score of the machine-learning object-detection model for the second LIDAR-based representation of the object; and adjust, based on at least one of the first object-detection-loss score or the second object-detection-loss score, at least one parameter of the machine-learning object-detection model. For example, loss calculator 410 may determine a first object-detection-loss score of machine-learning model 406 for the first LIDAR-based representation (of block 504) and a second object-detection-loos score of machine-learning model 406 for the second LIDAR-based representation (of block 506). The object-detection-loss scores may be included in loss data 414. System 400 (or machine-learning model 406) may adjust one or more parameters of machine-learning model 406 based on loss data 414.

In some aspects, the at least one parameter may be, or may include, a voxel size of a voxelizer of the machine-learning object-detection model. For example, the at least one parameter may be a voxel size of voxelizer 306. In some aspects, the at least one parameter may be, or may include, a first voxel size of voxels within a first distance range and a second voxel size of voxels within a second distance range. The first voxel size and the second voxel size may be parameters of a voxelizer of the machine-learning object-detection model. For example, voxelizer 306 may include parameters for voxel sizes for different ranges (e.g., range-based voxel sizes). One or more of the range-based voxel sizes may be adjusted.

In some aspects, the computing device (or one or more components thereof) may determine a first object-detection-loss score of the machine-learning object-detection model for the first LIDAR-based representation of the object; determine a second object-detection-loss score of the machine-learning object-detection model for the second LIDAR-based representation of the object; adapt the augmented LIDAR capture to generate an adapted LIDAR capture by: increasing or decreasing a number of instances of the first LIDAR-based representation of the object in the augmented LIDAR capture based on the first object-detection-loss score; and increasing or decreasing a number of instances of the second LIDAR-based representation of the object in the augmented LIDAR capture based on the second object-detection-loss score; and train the machine-learning object-detection model using the adapted LIDAR capture. For example, loss calculator 410 may determine a first object-detection-loss score of machine-learning model 406 for the first LIDAR-based representation (of block 504) and a second object-detection-loos score of machine-learning model 406 for the second LIDAR-based representation (of block 506). The object-detection-loss scores may be included in loss data 414. System 400 (or machine-learning model 406) may adjust one or more parameters of machine-learning model 406 based on loss data 414. Adaptive sample multiplier 416 may determine to increase or decrease a number of instances of the first LIDAR-based representation of the object in LIDAR captures 404 (e.g., further LIDAR captures 404 generated by training dataset provider 402) based on the first object-detection-loss score. Adaptive sample multiplier 416 may determine to increase or decrease a number of instances of the second LIDAR-based representation of the object in LIDAR captures 404 (e.g., further LIDAR captures 404 generated by training dataset provider 402) based on the second object-detection-loss score. System 400 may train machine-learning model 406 using the LIDAR captures 404 (e.g., further LIDAR captures 404 generated by training dataset provider 402).

In some aspects, the object of block 504 and block 506 may be a first object. The computing device (or one or more components thereof) may obtain a first LIDAR-based representation of a second object as captured from the first distance; and obtain a second LIDAR-based representation of the second object as captured from the second distance. The computing device (or one or more components thereof) may augment the LIDAR capture to generate the augmented LIDAR capture using the first LIDAR-based representation of the second object and the second LIDAR-based representation of the second object. For example, system 200 may generate augmented LIDAR captures 208 including first and second LIDAR-based representations of the first object (e.g., captured from a respective first and second distance) and first and second LIDAR-based representations of the second object (e.g., captured from a respective first and second distance).

Further, in such aspects, the computing device (or one or more components thereof) may determine a first object-detection-loss score of the machine-learning object-detection model for the first LIDAR-based representation of the first object; determine a second object-detection-loss score of the machine-learning object-detection model for the first LIDAR-based representation of the second object; and based on at least one of the first object-detection-loss score or the second object-detection-loss score, perform at least one of: adjust at least one parameter of the machine-learning object-detection model; or adapt the augmented LIDAR capture to generate an adapted LIDAR capture and train the machine-learning object-detection model using the adapted LIDAR capture. For example, loss calculator 410 may determine a first object-detection-loss score (of loss data 414) for the first object (e.g., based on the LIDAR-based representations of the first object) and a second object-detection-loss score (of loss data 414) for the second object (e.g., based on the LIDAR-based representations of the second object). Based on the first and second object-detection-loss scores, system 400 may adjust machine-learning model 406.

Additionally or alternatively, based on the first and second object-detection-loss scores, adaptive sample multiplier 416 may instruct training dataset provider 402 to adapt generation of further LIDAR captures 404 for training machine-learning model 406.

In some aspects, the first LIDAR-based representation of the object may be a first LIDAR-based representation of the object as captured from the first distance and from a first viewing angle. The computing device (or one or more components thereof) may obtain a third LIDAR-based representation of the object as captured from the first distance and from a second viewing angle, and augment the LIDAR capture to generate the augmented LIDAR capture using the third LIDAR-based representation of the object into the LIDAR capture. For example, system 200 may generate augmented LIDAR captures 208 including a LIDAR-based representation of the object at the first distance and from a first viewing angle and a third LIDAR-based representation of the object at the first distance and from a second viewing angle. In some aspects, the computing device (or one or more components thereof) may obtain a model of the object, simulate a LIDAR capture of the model of the object from the first distance and from the first viewing angle to generate the first LIDAR-based representation of the object, and simulate a LIDAR capture of the model of the object from the first distance and from the second viewing angle to generate the third LIDAR-based representation of the object Further, in such aspects, the computing device (or one or more components thereof) may determine a first object-detection-loss score of the machine-learning object-detection model for the first LIDAR-based representation of the object; determine a second object-detection-loss score of the machine-learning object-detection model for the third LIDAR-based representation of the object; and based on at least one of the first object-detection-loss score or the second object-detection-loss score, perform at least one of: adjust at least one parameter of the machine-learning object-detection model; or adapt the augmented LIDAR capture to generate an adapted LIDAR capture and train the machine-learning object-detection model using the adapted LIDAR capture. For example, loss calculator 410 may determine a first object-detection-loss score (of loss data 414) for the first object as viewed from the first viewing angle and a second object-detection-loss score (of loss data 414) for the first object as viewed from the second viewing angle. Based on the first and second object-detection-loss scores, system 400 may adjust machine-learning model 406. Additionally or alternatively, based on the first and second object-detection-loss scores, adaptive sample multiplier 416 may instruct training dataset provider 402 to adapt generation of further LIDAR captures 404 for training machine-learning model 406.

In some examples, the methods described herein (e.g., process 500 and/or other methods described herein) can be performed by a computing device or apparatus. In one example, one or more of the methods can be performed by all, or one or more elements of, system 200 of FIG. 2, system 300, of FIG. 3, and/or system 400 of FIG. 4. In another example, one or more of the methods can be performed by the computing system 800 shown in FIG. 8. For instance, a computing device with the computing system 800 shown in FIG. 8 can include one or more of the components of system 200, system 300, and/or system 400, and can implement the operations of the process 500 of FIG. 5, and/or other process described herein.

The computing device can include any suitable device, such as a server computer, a vehicle or a computing device of a vehicle, a mobile device (e.g., a mobile phone), a desktop computing device, a tablet computing device, a wearable device (e.g., a VR headset, an AR headset, AR glasses, a network-connected watch or smartwatch, or other wearable device), a robotic device, a television, and/or any other computing device with the resource capabilities to perform the processes described herein, including process 500, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 500 and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 500, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

Figure 6:
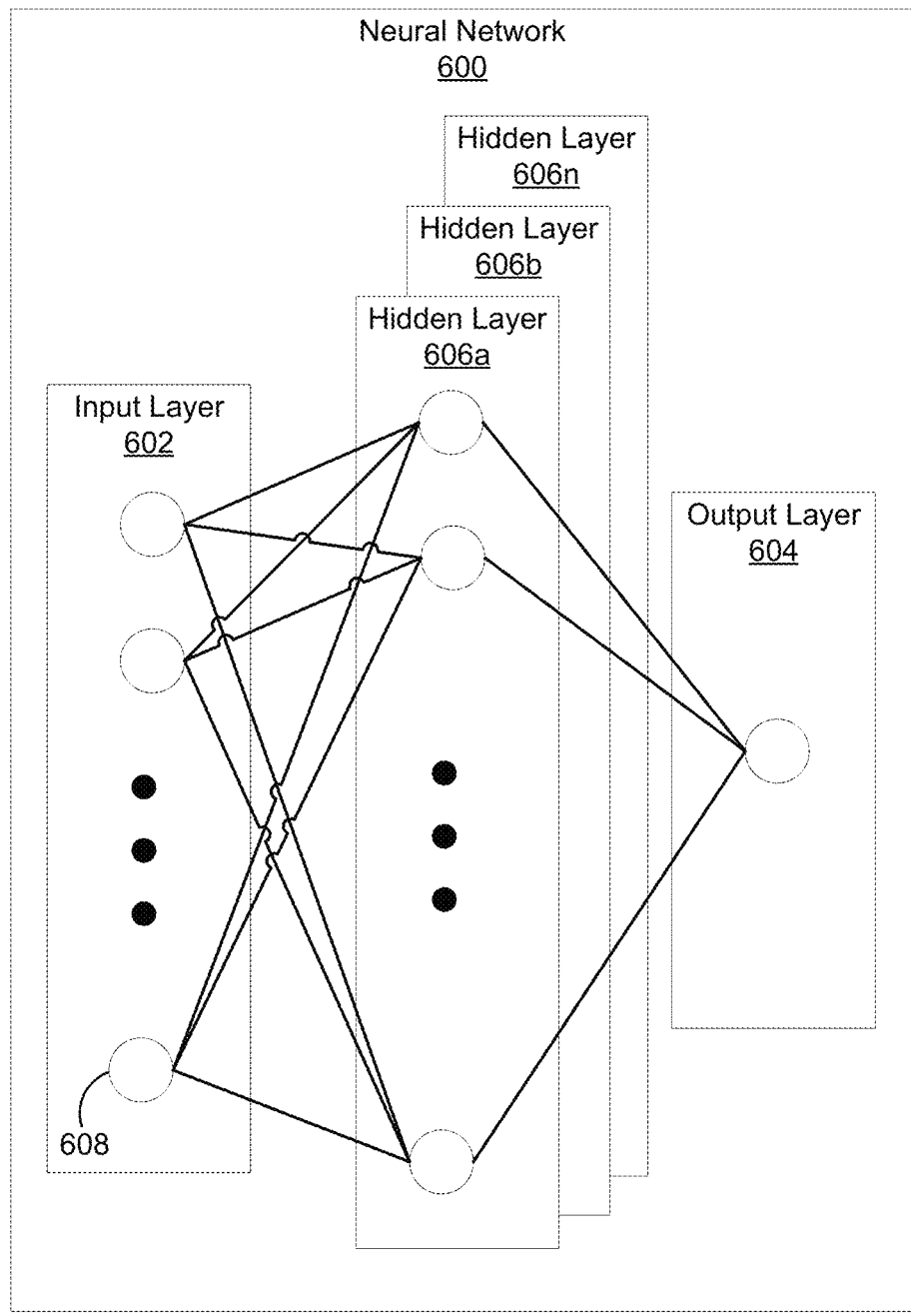
FIG. 6 is an illustrative example of a deep learning neural network, in accordance with various aspects of the present disclosure.

As noted above, various aspects of the present disclosure can use machine learning models or systems. FIG. 6 is an illustrative example of a neural network 600 (e.g., a deep-learning neural network) that can be used to implement the object detection and/or object classification described above. An input layer 602 includes input data. In one illustrative example, input layer 602 can include data representing the pixels of an input image. Neural network 600 includes multiple hidden layers 606a, 606b, through 606n. The hidden layers 606a, 606b, through 606n include "n" number of hidden layers, where "n" is an integer greater than or equal to one. The number of hidden layers can be made to include as many layers as needed for the given application. Neural network 600 further includes an output layer 604 that provides an output resulting from the processing performed by the hidden layers 606a, 606b, through 606n. In one illustrative example, output layer 604 can detect objects in a LIDAR input image.

Neural network 600 can be, or can include, a multi-layer neural network of interconnected nodes. Each node can represent a piece of information. Information associated with the nodes is shared among the different layers and each layer retains information as information is processed. In some cases, neural network 600 can include a feed-forward network, in which case there are no feedback connections where outputs of the network are fed back into itself. In some cases, neural network 600 can include a recurrent neural network, which can have loops that allow information to be carried across nodes while reading in input.

Information can be exchanged between nodes through node-to-node interconnections between the various layers. Nodes of input layer 602 can activate a set of nodes in the first hidden layer 606a. For example, as shown, each of the input nodes of input layer 602 is connected to each of the nodes of the first hidden layer 606a. The nodes of first hidden layer 606a can transform the information of each input node by applying activation functions to the input node information. The information derived from the transformation can then be passed to and can activate the nodes of the next hidden layer 606b, which can perform their own designated functions. Example functions include convolutional, up-sampling, data transformation, and/or any other suitable functions. The output of the hidden layer 606b can then activate nodes of the next hidden layer, and so on. The output of the last hidden layer 606n can activate one or more nodes of the output layer 604, at which an output is provided. In some cases, while nodes (e.g., node 608) in neural network 600 are shown as having multiple output lines, a node has a single output and all lines shown as being output from a node represent the same output value.

In some cases, each node or interconnection between nodes can have a weight that is a set of parameters derived from the training of neural network 600. Once neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing neural network 600 to be adaptive to inputs and able to learn as more and more data is processed.

Neural network 600 may be pre-trained to process the features from the data in the input layer 602 using the different hidden layers 606a, 606b, through 606n in order to provide the output through the output layer 604. In an example in which neural network 600 is used to identify features in images, neural network 600 can be trained using training data that includes both images and labels, as described above. For instance, training images can be input into the network, with each training image having a label indicating the features in the images (for the feature segmentation machine learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 600 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 600 is trained well enough so that the weights of the layers are accurately tuned.

For the example of identifying objects in images, the forward pass can include passing a training image through neural network 600. The weights are initially randomized before neural network 600 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 600, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 600 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $E_{total}=\Sigma\frac{1}{2}(target-output)^2$. The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 600 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_t-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers.

Neural network 600 can include any other deep network other than a CNN, such as an autoencoder, a deep belief nets (DBNs), a Recurrent Neural Networks (RNNs), among others.

Figure 7:
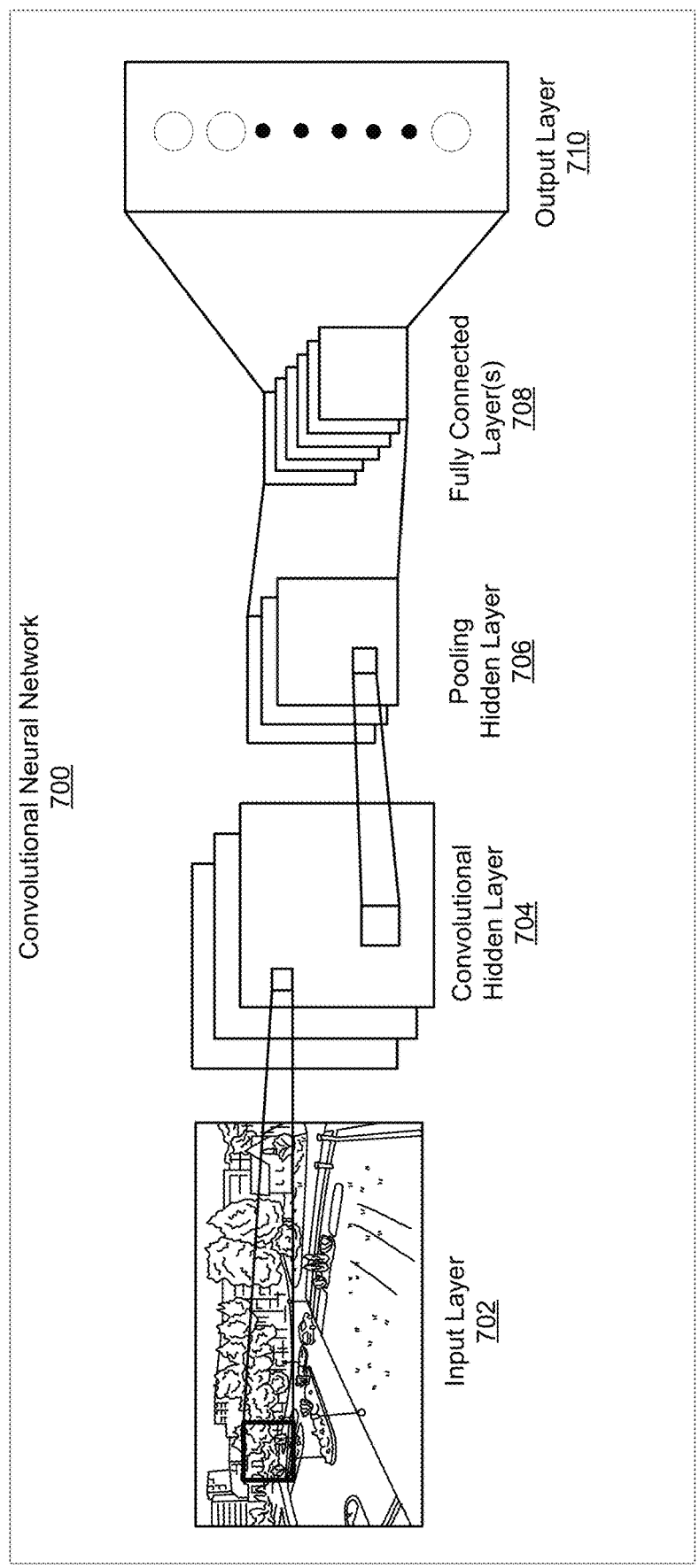
FIG. 7 is an illustrative example of a convolutional neural network (CNN), in accordance with various aspects of the present disclosure.

FIG. 7 is an illustrative example of a convolutional neural network (CNN) 700. The input layer 702 of the CNN 700 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 704, an optional non-linear activation layer, a pooling hidden layer 706, and fully connected layer 708 (which fully connected layer 708 can be hidden) to get an output at the output layer 710. While only one of each hidden layer is shown in FIG. 7, one of ordinary skill will appreciate that multiple convolutional hidden layers, non-linear layers, pooling hidden layers, and/or fully connected layers can be included in the CNN 700. As previously described, the output can indicate a single class of an object or can include a probability of classes that best describe the object in the image.

The first layer of the CNN 700 can be the convolutional hidden layer 704. The convolutional hidden layer 704 can analyze image data of the input layer 702. Each node of the convolutional hidden layer 704 is connected to a region of nodes (pixels) of the input image called a receptive field. The convolutional hidden layer 704 can be considered as one or more filters (each filter corresponding to a different activation or feature map), with each convolutional iteration of a filter being a node or neuron of the convolutional hidden layer 704. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 704. Each connection between a node and a receptive field for that node learns a weight and, in some cases, an overall bias such that each node learns to analyze its particular local receptive field in the input image. Each node of the convolutional hidden layer 704 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 704 is due to each node of the convolutional layer being applied to its corresponding receptive field. For example, a filter of the convolutional hidden layer 704 can begin in the top-left corner of the input image array and can convolve around the input image. As noted above, each convolutional iteration of the filter can be considered a node or neuron of the convolutional hidden layer 704. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 704. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 704.

The mapping from the input layer to the convolutional hidden layer 704 is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 704 can include several activation maps in order to identify multiple features in an image. The example shown in FIG. 7 includes three activation maps. Using three activation maps, the convolutional hidden layer 704 can detect three different kinds of features, with each feature being detectable across the entire image.

In some examples, a non-linear hidden layer can be applied after the convolutional hidden layer 704. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 700 without affecting the receptive fields of the convolutional hidden layer 704.

The pooling hidden layer 706 can be applied after the convolutional hidden layer 704 (and after the non-linear hidden layer when used). The pooling hidden layer 706 is used to simplify the information in the output from the convolutional hidden layer 704. For example, the pooling hidden layer 706 can take each activation map output from the convolutional hidden layer 704 and generates a condensed activation map (or feature map) using a pooling function. Max-pooling is one example of a function performed by a pooling hidden layer. Other forms of pooling functions be used by the pooling hidden layer 706, such as average pooling, L2-norm pooling, or other suitable pooling functions. A pooling function (e.g., a max-pooling filter, an L2-norm filter, or other suitable pooling filter) is applied to each activation map included in the convolutional hidden layer 704. In the example shown in FIG. 7, three pooling filters are used for the three activation maps in the convolutional hidden layer 704.

In some examples, max-pooling can be used by applying a max-pooling filter (e.g., having a size of 2×2) with a stride (e.g., equal to a dimension of the filter, such as a stride of 2) to an activation map output from the convolutional hidden layer 704. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 704 having a dimension of 24×24 nodes, the output from the pooling hidden layer 706 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

The pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 700.

The final layer of connections in the network is a fully-connected layer that connects every node from the pooling hidden layer 706 to every one of the output nodes in the output layer 710. Using the example above, the input layer includes 28×28 nodes encoding the pixel intensities of the input image, the convolutional hidden layer 704 includes 3×24×24 hidden feature nodes based on application of a 5×5 local receptive field (for the filters) to three activation maps, and the pooling hidden layer 706 includes a layer of 3×12×12 hidden feature nodes based on application of max-pooling filter to 2×2 regions across each of the three feature maps. Extending this example, the output layer 710 can include ten output nodes. In such an example, every node of the 3×12×12 pooling hidden layer 706 is connected to every node of the output layer 710.

The fully connected layer 708 can obtain the output of the previous pooling hidden layer 706 (which should represent the activation maps of high-level features) and determines the features that most correlate to a particular class. For example, the fully connected layer 708 can determine the high-level features that most strongly correlate to a particular class, and can include weights (nodes) for the high-level features. A product can be computed between the weights of the fully connected layer 708 and the pooling hidden layer 706 to obtain probabilities for the different classes. For example, if the CNN 700 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 710 can include an M-dimensional vector (in the prior example, M=10). M indicates the number of classes that the CNN 700 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 8:
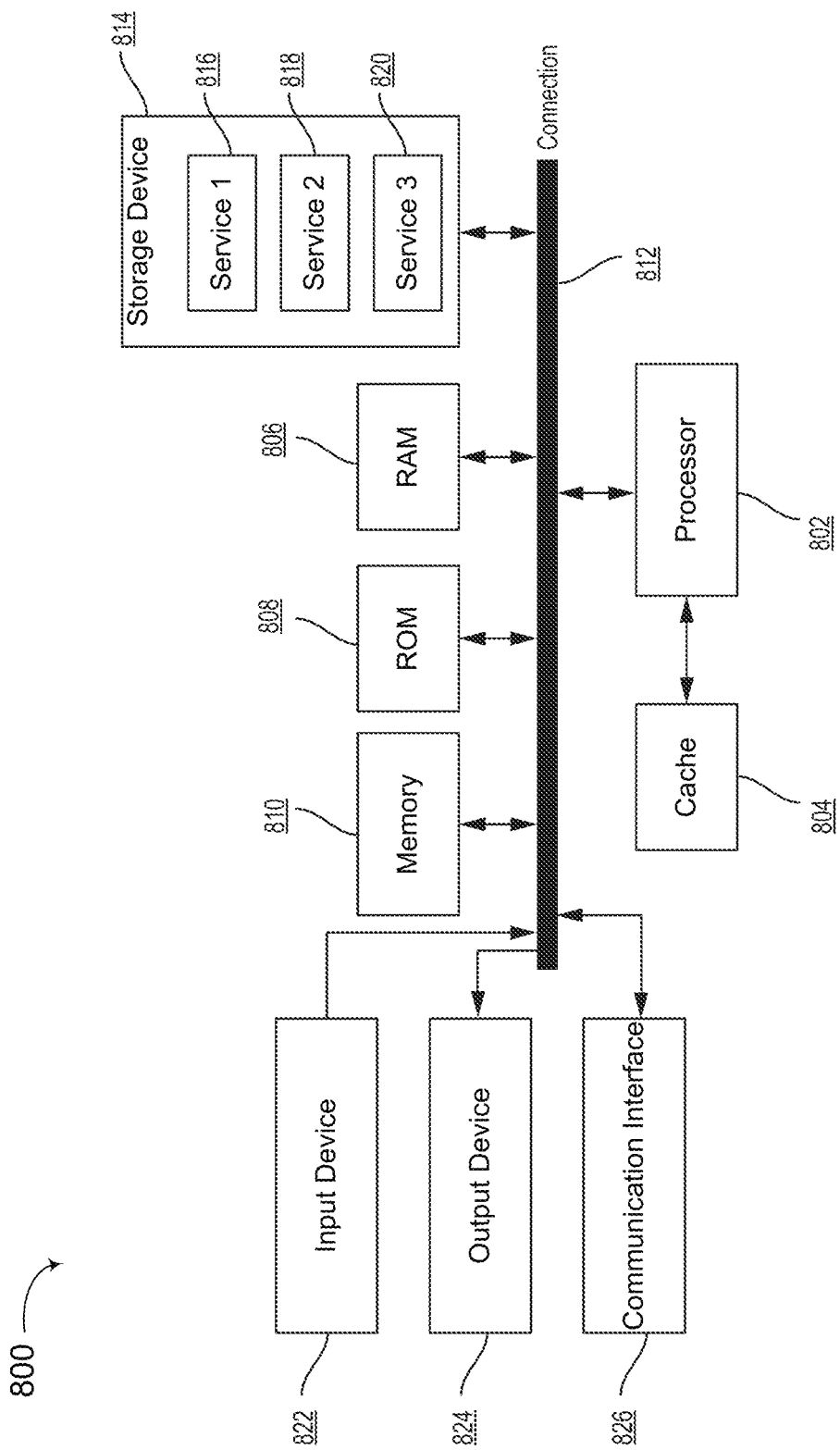
FIG. 8 is a diagram illustrating an example of a computing system, according to aspects of the disclosure.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 812. Connection 812 can be a physical connection using a bus, or a direct connection into processor 802, such as in a chipset architecture. Connection 812 can also be a virtual connection, networked connection, or logical connection.

In some aspects, computing system 800 can be a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 800 includes at least one processing unit (CPU or processor) 802 and connection 812 that couples various system components including system memory 810, such as read-only memory (ROM) 808 and random-access memory (RAM) 806 to processor 802. Computing system 800 can include a cache 804 of high-speed memory connected directly with, in close proximity to, or integrated as part of processor 802.

Processor 802 can include any general-purpose processor and a hardware service or software service, such as services 816, 818, and 820 stored in storage device 814, configured to control processor 802 as well as a special-purpose processor where software instructions are incorporated into the actual processor design. Processor 802 can essentially be a completely self-contained computing system, containing multiple cores or processors, a bus, memory controller, cache, etc. A multi-core processor can be symmetric or asymmetric.

To enable user interaction, computing system 800 includes an input device 822, which can represent any number of input mechanisms, such as a microphone for speech, a touch-sensitive screen for gesture or graphical input, keyboard, mouse, motion input, speech, etc. Computing system 800 can also include output device 824, which can be one or more of a number of output mechanisms. In some instances, multimodal systems can enable a user to provide multiple types of input/output to communicate with computing system 800. Computing system 800 can include communication interface 826, which can generally govern and manage the user input and system output. Communication interface 826 can perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 can also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 814 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 814 can include software services, servers, services, etc., that when the code that defines such software is executed by the processor 802, it causes the system to perform a function. In some aspects, a hardware service that performs a particular function can include the software component stored in a computer-readable medium in connection with hardware components, such as processor 802, connection 812, output device 824, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium can include a non-transitory medium in which data can be stored and that does not include carrier waves and/or transitory electronic signals propagating wirelessly or over wired connections. Examples of a non-transitory medium can include, but are not limited to, a magnetic disk or tape, optical storage media such as compact disk (CD) or digital versatile disk (DVD), flash memory, memory or memory devices. A computer-readable medium can have stored thereon code and/or machine-executable instructions that can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects can be practiced without these specific details. For clarity of explanation, in some instances the present technology can be presented as including individual functional blocks including functional blocks comprising devices, device components, steps or routines in a method embodied in software, or combinations of hardware and software. Additional components can be used other than those shown in the figures and/or described herein. For example, circuits, systems, networks, processes, and other components can be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects can be described above as a process or method which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions can be, for example, binaries, intermediate format instructions such as assembly language, firmware, source code, etc. Examples of computer-readable media that can be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the tasks (e.g., a computer-program product) can be stored in a computer-readable or machine-readable medium. A processor(s) can perform the tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the concepts can be otherwise variously embodied and employed, and that the appended claims are intended to be construed to include such variations, except as limited by the prior art. Various features and aspects of the above-described application can be used individually or jointly. Further, aspects can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate aspects, the methods can be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein can be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present application.

The techniques described herein can also be implemented in electronic hardware, computer software, firmware, or any combination thereof. Such techniques can be implemented in any of a variety of devices such as general-purpose computers, wireless communication device handsets, or integrated circuit devices having multiple uses including application in wireless communication device handsets and other devices. Any features described as modules or components can be implemented together in an integrated logic device or separately as discrete but interoperable logic devices. If implemented in software, the techniques can be realized at least in part by a computer-readable data storage medium comprising program code including instructions that, when executed, performs one or more of the methods described above. The computer-readable data storage medium can form part of a computer program product, which can include packaging materials. The computer-readable medium can comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, can be realized at least in part by a computer-readable communication medium that carries or communicates program code in the form of instructions or data structures and that can be accessed, read, and/or executed by a computer, such as propagated signals or waves.

The program code can be executed by a processor, which can include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor can be configured to perform any of the techniques described in this disclosure. A general-purpose processor can be a microprocessor; but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for training an object-detection model, the apparatus comprising: at least one memory; and at least one processor coupled to the at least one memory and configured to: obtain a light detection and ranging (LIDAR) capture; obtain a first LIDAR-based representation of an object as captured from a first distance; obtain a second LIDAR-based representation of the object as captured from a second distance; augment the LIDAR capture using the first LIDAR-based representation of the object and the second LIDAR-based representation of the object to generate an augmented LIDAR capture; and train a machine-learning object-detection model using the augmented LIDAR capture.

Aspect 2. The apparatus of aspect 1, wherein to augment the LIDAR capture, the at least one processor is configured to add the first LIDAR-based representation of the object and the second LIDAR-based representation of the object into the LIDAR capture.

Aspect 3. The apparatus of any one of aspects 1 or 2, wherein the at least one processor is further configured to: determine a first object-detection-loss score of the machine-learning object-detection model for the first LIDAR-based representation of the object; determine a second object-detection-loss score of the machine-learning object-detection model for the second LIDAR-based representation of the object; and adjust, based on at least one of the first object-detection-loss score or the second object-detection-loss score, at least one parameter of the machine-learning object-detection model.

Aspect 4. The apparatus of aspect 3, wherein the at least one parameter comprises a voxel size of a voxelizer of the machine-learning object-detection model.

Aspect 5. The apparatus of any one of aspects 3 or 4, wherein: the at least one parameter comprise a first voxel size of voxels within a first distance range and a second voxel size of voxels within a second distance range; and the first voxel size and the second voxel size are parameters of a voxelizer of the machine-learning object-detection model.

Aspect 6. The apparatus of any one of aspects 1 to 5, wherein the at least one processor is further configured to: determine a first object-detection-loss score of the machine-learning object-detection model for the first LIDAR-based representation of the object; determine a second object-detection-loss score of the machine-learning object-detection model for the second LIDAR-based representation of the object; adapt the augmented LIDAR capture to generate an adapted LIDAR capture by: increasing or decreasing a number of instances of the first LIDAR-based representation of the object in the augmented LIDAR capture based on the first object-detection-loss score; and increasing or decreasing a number of instances of the second LIDAR-based representation of the object in the augmented LIDAR capture based on the second object-detection-loss score; and train the machine-learning object-detection model using the adapted LIDAR capture.

Aspect 7. The apparatus of any one of aspects 1 to 6, wherein the at least one processor is further configured to obtain a model of the object; to obtain the first LIDAR-based representation of the object, the at least one processor is configured to simulate a LIDAR capture of the model of the object from the first distance; and to obtain the second LIDAR-based representation of the object, the at least one processor is configured to simulate a LIDAR capture of the model of the object from the second distance.

Aspect 8. The apparatus of aspect 7, wherein the at least one processor is further configured to: simulate a three-dimensional environment including a simulated LIDAR-capture system; and position the model of the object within the simulated three-dimensional environment at a simulated first distance from the simulated LIDAR-capture system, the simulated first distance corresponding to the first distance; wherein to simulate the LIDAR capture of the model of the object from the first distance, the at least one processor is configured to simulate the LIDAR capture from the model of the object positioned within the three-dimensional environment at the simulated first distance from the LIDAR-capture system.

Aspect 9. The apparatus of any one of aspects 7 or 8, wherein the model of the object comprises a point-cloud model of the object.

Aspect 10. The apparatus of any one of aspects 1 to 9, wherein: the object comprises a first object; the at least one processor is further configured to: obtain a first LIDAR-based representation of a second object as captured from the first distance; and obtain a second LIDAR-based representation of the second object as captured from the second distance; and to augment the LIDAR capture to generate the augmented LIDAR capture, the at least one processor is configured to use the first LIDAR-based representation of the second object and the second LIDAR-based representation of the second object.

Aspect 11. The apparatus of aspect 10, wherein the at least one processor is further configured to: determine a first object-detection-loss score of the machine-learning object-detection model for the first LIDAR-based representation of the first object; determine a second object-detection-loss score of the machine-learning object-detection model for the first LIDAR-based representation of the second object; and based on at least one of the first object-detection-loss score or the second object-detection-loss score, perform at least one of: adjust at least one parameter of the machine-learning object-detection model; or adapt the augmented LIDAR capture to generate an adapted LIDAR capture and train the machine-learning object-detection model using the adapted LIDAR capture.

Aspect 12. The apparatus of any one of aspects 1 to 11, wherein: the first LIDAR-based representation of the object comprises the first LIDAR-based representation of the object as captured from the first distance and from a first viewing angle, the at least one processor is further configured to: obtain a third LIDAR-based representation of the object as captured from the first distance and from a second viewing angle, and to augment the LIDAR capture to generate the augmented LIDAR capture, the at least one processor is configured to use the third LIDAR-based representation of the object into the LIDAR capture.

Aspect 13. The apparatus of aspect 12, wherein the at least one processor is further configured to: determine a first object-detection-loss score of the machine-learning object-detection model for the first LIDAR-based representation of the object; determine a second object-detection-loss score of the machine-learning object-detection model for the third LIDAR-based representation of the object; and based on at least one of the first object-detection-loss score or the second object-detection-loss score, perform at least one of: adjust at least one parameter of the machine-learning object-detection model; or adapt the augmented LIDAR capture to generate an adapted LIDAR capture and train the machine-learning object-detection model using the adapted LIDAR capture.

Aspect 14. The apparatus of any one of aspects 12 or 13, wherein: the at least one processor is further configured to obtain a model of the object; to obtain the first LIDAR-based representation of the object, the at least one processor is configured to simulate a LIDAR capture of the model of the object from the first distance and from the first viewing angle; and to obtain the third LIDAR-based representation of the object, the at least one processor is configured to simulate a LIDAR capture of the model of the object from the first distance and from the second viewing angle.

Aspect 15. A method for training an object-detection model, the method comprising: obtaining a light detection and ranging (LIDAR) capture; obtaining a first LIDAR-based representation of an object as captured from a first distance; obtaining a second LIDAR-based representation of the object as captured from a second distance; augmenting the LIDAR capture using the first LIDAR-based representation of the object and the second LIDAR-based representation of the object to generate an augmented LIDAR capture; and training a machine-learning object-detection model using the augmented LIDAR capture.

Aspect 16. The method of aspect 15, wherein augmenting the LIDAR capture comprises: adding the first LIDAR-based representation of the object and the second LIDAR-based representation of the object into the LIDAR capture.

Aspect 17. The method of any one of aspects 15 or 16, further comprising: determining a first object-detection-loss score of the machine-learning object-detection model for the first LIDAR-based representation of the object; determining a second object-detection-loss score of the machine-learning object-detection model for the second LIDAR-based representation of the object; and adjusting, based on at least one of the first object-detection-loss score or the second object-detection-loss score, at least one parameter of the machine-learning object-detection model.

Aspect 18. The method of aspect 17, wherein the at least one parameter comprises a voxel size of a voxelizer of the machine-learning object-detection model.

Aspect 19. The method of any one of aspects 17 or 18, wherein: the at least one parameter comprise a first voxel size of voxels within a first distance range and a second voxel size of voxels within a second distance range; and the first voxel size and the second voxel size are parameters of a voxelizer of the machine-learning object-detection model.

Aspect 20. The method of any one of aspects 15 to 19, further comprising: determining a first object-detection-loss score of the machine-learning object-detection model for the first LIDAR-based representation of the object; determining a second object-detection-loss score of the machine-learning object-detection model for the second LIDAR-based representation of the object; adapting the augmented LIDAR capture to generate an adapted LIDAR capture by: increasing or decreasing a number of instances of the first LIDAR-based representation of the object in the augmented LIDAR capture based on the first object-detection-loss score; and increasing or decreasing a number of instances of the second LIDAR-based representation of the object in the augmented LIDAR capture based on the second object-detection-loss score; and training the machine-learning object-detection model using the adapted LIDAR capture.

Aspect 21. The method of any one of aspects 15 to 20, further comprising obtaining a model of the object, wherein: obtaining the first LIDAR-based representation of the object comprises simulating a LIDAR capture of the model of the object from the first distance; and obtaining the second LIDAR-based representation of the object comprises simulating a LIDAR capture of the model of the object from the second distance.

Aspect 22. The method of aspect 21, further comprising: simulating a three-dimensional environment including a simulated LIDAR-capture system; and positioning the model of the object within the simulated three-dimensional environment at a simulated first distance from the simulated LIDAR-capture system, the simulated first distance corresponding to the first distance; wherein simulating the LIDAR capture of the model of the object from the first distance comprises simulating the LIDAR capture from the model of the object positioned within the three-dimensional environment at the simulated first distance from the LIDAR-capture system.

Aspect 23. The method of any one of aspects 21 or 22, wherein the model of the object comprises a point-cloud model of the object.

Aspect 24. The method of any one of aspects 15 to 23, wherein: the object comprises a first object; the method further comprises: obtaining a first LIDAR-based representation of a second object as captured from the first distance; and obtaining a second LIDAR-based representation of the second object as captured from the second distance; and augmenting the LIDAR capture to generate the augmented LIDAR capture further comprises using the first LIDAR-based representation of the second object and the second LIDAR-based representation of the second object.

Aspect 25. The method of aspect 24, further comprising: determining a first object-detection-loss score of the machine-learning object-detection model for the first LIDAR-based representation of the first object; determining a second object-detection-loss score of the machine-learning object-detection model for the first LIDAR-based representation of the second object; and based on at least one of the first object-detection-loss score or the second object-detection-loss score, performing at least one of: adjusting at least one parameter of the machine-learning object-detection model; or adapting the augmented LIDAR capture to generate an adapted LIDAR capture and training the machine-learning object-detection model using the adapted LIDAR capture.

Aspect 26. The method of any one of aspects 15 to 25, wherein: the first LIDAR-based representation of the object comprises the first LIDAR-based representation of the object as captured from the first distance and from a first viewing angle, the method further comprises: obtaining a third LIDAR-based representation of the object as captured from the first distance and from a second viewing angle, and augmenting the LIDAR capture to generate the augmented LIDAR capture further comprises using the third LIDAR-based representation of the object into the LIDAR capture.

Aspect 27. The method of aspect 26, further comprising: determining a first object-detection-loss score of the machine-learning object-detection model for the first LIDAR-based representation of the object; determining a second object-detection-loss score of the machine-learning object-detection model for the third LIDAR-based representation of the object; and based on at least one of the first object-detection-loss score or the second object-detection-loss score, performing at least one of: adjusting at least one parameter of the machine-learning object-detection model; or adapting the augmented LIDAR capture to generate an adapted LIDAR capture and training the machine-learning object-detection model using the adapted LIDAR capture.

Aspect 28. The method of any one of aspects 26 or 27, wherein: the method further comprises obtaining a model of the object; obtaining the first LIDAR-based representation of the object comprises simulating a LIDAR capture of the model of the object from the first distance and from the first viewing angle; and obtaining the third LIDAR-based representation of the object comprises simulating a LIDAR capture of the model of the object from the first distance and from the second viewing angle.

Aspect 29. A non-transitory computer-readable storage medium having stored thereon instructions that, when executed by at least one processor, cause the at least one processor to perform operations according to any of aspects 15 to 28.

Aspect 30. An apparatus for providing virtual content for display, the apparatus comprising one or more means for perform operations according to any of aspects 15 to 28.

What is claimed is:

1. An apparatus for training an object-detection model, the apparatus comprising:
    at least one memory; and
    at least one processor coupled to the at least one memory and configured to:
        obtain a light detection and ranging (LIDAR) capture, wherein the LIDAR capture comprises a first three-dimensional (3D) point cloud that represents an environment;
        obtain a first LIDAR-based representation of an object as captured from a first distance, wherein the first LIDAR-based representation of the object comprises a first 3D point cloud that represents the object;
        obtain a second LIDAR-based representation of the object as captured from a second distance, wherein the second LIDAR-based representation of the object comprises a second 3D point cloud that represents the object;
        augment the LIDAR capture using the first LIDAR-based representation of the object and the second LIDAR-based representation of the object to generate an augmented LIDAR capture, wherein the augmented LIDAR capture comprises a second 3D point cloud that represents the environment; and
        train a machine-learning object-detection model using the augmented LIDAR capture.

2. The apparatus of claim 1, wherein, to augment the LIDAR capture, the at least one processor is configured to add the first LIDAR-based representation of the object and the second LIDAR-based representation of the object into the LIDAR capture.

3. The apparatus of claim 1, wherein the at least one processor is further configured to:
    determine a first object-detection-loss score of the machine-learning object-detection model for the first LIDAR-based representation of the object;
    determine a second object-detection-loss score of the machine-learning object-detection model for the second LIDAR-based representation of the object; and
    adjust, based on at least one of the first object-detection-loss score or the second object-detection-loss score, at least one parameter of the machine-learning object-detection model.

4. The apparatus of claim 3, wherein the at least one parameter comprises a voxel size of a voxelizer of the machine-learning object-detection model.

5. The apparatus of claim 3, wherein:
    the at least one parameter comprise a first voxel size of voxels within a first distance range and a second voxel size of voxels within a second distance range; and
    the first voxel size and the second voxel size are parameters of a voxelizer of the machine-learning object-detection model.

6. The apparatus of claim 1, wherein the at least one processor is further configured to:
    determine a first object-detection-loss score of the machine-learning object-detection model for the first LIDAR-based representation of the object;
    determine a second object-detection-loss score of the machine-learning object-detection model for the second LIDAR-based representation of the object;
    adapt the augmented LIDAR capture to generate an adapted LIDAR capture at least in part by:
        increasing or decreasing a number of instances of the first LIDAR-based representation of the object in the augmented LIDAR capture based on the first object-detection-loss score; and
        increasing or decreasing a number of instances of the second LIDAR-based representation of the object in the augmented LIDAR capture based on the second object-detection-loss score; and
    train the machine-learning object-detection model using the adapted LIDAR capture.

7. The apparatus of claim 1, wherein:
    the at least one processor is further configured to obtain a model of the object;
    to obtain the first LIDAR-based representation of the object, the at least one processor is configured to simulate a LIDAR capture of the model of the object from the first distance; and
    to obtain the second LIDAR-based representation of the object, the at least one processor is configured to simulate a LIDAR capture of the model of the object from the second distance.

8. The apparatus of claim 7, wherein the at least one processor is further configured to:
    simulate a three-dimensional environment including a simulated LIDAR-capture system; and
    position the model of the object within the simulated three-dimensional environment at a simulated first distance from the simulated LIDAR-capture system, the simulated first distance corresponding to the first distance;
    wherein to simulate the LIDAR capture of the model of the object from the first distance, the at least one processor is configured to simulate the LIDAR capture from the model of the object positioned within the three-dimensional environment at the simulated first distance from the LIDAR-capture system.

9. The apparatus of claim 7, wherein the model of the object comprises a point-cloud model of the object.

10. The apparatus of claim 1, wherein:
the object comprises a first object;
the at least one processor is further configured to:
obtain a first LIDAR-based representation of a second object as captured from the first distance; and
obtain a second LIDAR-based representation of the second object as captured from the second distance; and
to augment the LIDAR capture to generate the augmented LIDAR capture, the at least one processor is configured to use the first LIDAR-based representation of the second object and the second LIDAR-based representation of the second object.

11. The apparatus of claim 10, wherein the at least one processor is further configured to:
determine a first object-detection-loss score of the machine-learning object-detection model for the first LIDAR-based representation of the first object;
determine a second object-detection-loss score of the machine-learning object-detection model for the first LIDAR-based representation of the second object; and
based on at least one of the first object-detection-loss score or the second object-detection-loss score, perform at least one of:
adjust at least one parameter of the machine-learning object-detection model; or
adapt the augmented LIDAR capture to generate an adapted LIDAR capture and train the machine-learning object-detection model using the adapted LIDAR capture.

12. The apparatus of claim 1, wherein:
the first LIDAR-based representation of the object comprises the first LIDAR-based representation of the object as captured from the first distance and from a first viewing angle; and
the at least one processor is further configured to:
obtain a third LIDAR-based representation of the object as captured from the first distance and from a second viewing angle, and
to augment the LIDAR capture to generate the augmented LIDAR capture, the at least one processor is configured to use the third LIDAR-based representation of the object into the LIDAR capture.

13. The apparatus of claim 12, wherein the at least one processor is further configured to:
determine a first object-detection-loss score of the machine-learning object-detection model for the first LIDAR-based representation of the object;
determine a second object-detection-loss score of the machine-learning object-detection model for the third LIDAR-based representation of the object; and
based on at least one of the first object-detection-loss score or the second object-detection-loss score, perform at least one of:
adjust at least one parameter of the machine-learning object-detection model; or
adapt the augmented LIDAR capture to generate an adapted LIDAR capture and train the machine-learning object-detection model using the adapted LIDAR capture.

14. The apparatus of claim 12, wherein:
the at least one processor is further configured to obtain a model of the object;
to obtain the first LIDAR-based representation of the object, the at least one processor is configured to simulate a LIDAR capture of the model of the object from the first distance and from the first viewing angle; and
to obtain the third LIDAR-based representation of the object, the at least one processor is configured to simulate a LIDAR capture of the model of the object from the first distance and from the second viewing angle.

15. A method for training an object-detection model, the method comprising:
obtaining a light detection and ranging (LIDAR) capture, wherein the LIDAR capture comprises a first three-dimensional (3D) point cloud that represents an environment;
obtaining a first LIDAR-based representation of an object as captured from a first distance, wherein the first LIDAR-based representation of the object comprises a first 3D point cloud that represents the object;
obtaining a second LIDAR-based representation of the object as captured from a second distance, wherein the second LIDAR-based representation of the object comprises a second 3D point cloud that represents the object;
augmenting the LIDAR capture using the first LIDAR-based representation of the object and the second LIDAR-based representation of the object to generate an augmented LIDAR capture, wherein the augmented LIDAR capture comprises a second 3D point cloud that represents the environment; and
training a machine-learning object-detection model using the augmented LIDAR capture.

16. The method of claim 15, wherein augmenting the LIDAR capture comprises:
adding the first LIDAR-based representation of the object and the second LIDAR-based representation of the object into the LIDAR capture.

17. The method of claim 15, further comprising:
determining a first object-detection-loss score of the machine-learning object-detection model for the first LIDAR-based representation of the object;
determining a second object-detection-loss score of the machine-learning object-detection model for the second LIDAR-based representation of the object; and
adjusting, based on at least one of the first object-detection-loss score or the second object-detection-loss score, at least one parameter of the machine-learning object-detection model.

18. The method of claim 17, wherein the at least one parameter comprises a voxel size of a voxelizer of the machine-learning object-detection model.

19. The method of claim 17, wherein:
the at least one parameter comprise a first voxel size of voxels within a first distance range and a second voxel size of voxels within a second distance range; and
the first voxel size and the second voxel size are parameters of a voxelizer of the machine-learning object-detection model.

20. The method of claim 15, further comprising:
determining a first object-detection-loss score of the machine-learning object-detection model for the first LIDAR-based representation of the object;

determining a second object-detection-loss score of the machine-learning object-detection model for the second LIDAR-based representation of the object;
adapting the augmented LIDAR capture to generate an adapted LIDAR capture by:
increasing or decreasing a number of instances of the first LIDAR-based representation of the object in the augmented LIDAR capture based on the first object-detection-loss score; and
increasing or decreasing a number of instances of the second LIDAR-based representation of the object in the augmented LIDAR capture based on the second object-detection-loss score; and
training the machine-learning object-detection model using the adapted LIDAR capture.

21. The method of claim 15, further comprising obtaining a model of the object, wherein:
obtaining the first LIDAR-based representation of the object comprises simulating a LIDAR capture of the model of the object from the first distance; and
obtaining the second LIDAR-based representation of the object comprises simulating a LIDAR capture of the model of the object from the second distance.

22. The method of claim 21, further comprising:
simulating a three-dimensional environment including a simulated LIDAR-capture system; and
positioning the model of the object within the simulated three-dimensional environment at a simulated first distance from the simulated LIDAR-capture system, the simulated first distance corresponding to the first distance;
wherein simulating the LIDAR capture of the model of the object from the first distance comprises simulating the LIDAR capture from the model of the object positioned within the three-dimensional environment at the simulated first distance from the LIDAR-capture system.

23. The method of claim 21, wherein the model of the object comprises a point-cloud model of the object.

24. The method of claim 15, wherein:
the object comprises a first object;
the method further comprises:
obtaining a first LIDAR-based representation of a second object as captured from the first distance; and
obtaining a second LIDAR-based representation of the second object as captured from the second distance; and
augmenting the LIDAR capture to generate the augmented LIDAR capture further comprises using the first LIDAR-based representation of the second object and the second LIDAR-based representation of the second object.

25. The method of claim 24, further comprising:
determining a first object-detection-loss score of the machine-learning object-detection model for the first LIDAR-based representation of the first object;
determining a second object-detection-loss score of the machine-learning object-detection model for the first LIDAR-based representation of the second object; and
based on at least one of the first object-detection-loss score or the second object-detection-loss score, performing at least one of:
adjusting at least one parameter of the machine-learning object-detection model; or
adapting the augmented LIDAR capture to generate an adapted LIDAR capture and training the machine-learning object-detection model using the adapted LIDAR capture.

26. The method of claim 15, wherein:
the first LIDAR-based representation of the object comprises the first LIDAR-based representation of the object as captured from the first distance and from a first viewing angle; and
the method further comprises:
obtaining a third LIDAR-based representation of the object as captured from the first distance and from a second viewing angle, and
augmenting the LIDAR capture to generate the augmented LIDAR capture further comprises using the third LIDAR-based representation of the object into the LIDAR capture.

27. The method of claim 26, further comprising:
determining a first object-detection-loss score of the machine-learning object-detection model for the first LIDAR-based representation of the object;
determining a second object-detection-loss score of the machine-learning object-detection model for the third LIDAR-based representation of the object; and
based on at least one of the first object-detection-loss score or the second object-detection-loss score, performing at least one of:
adjusting at least one parameter of the machine-learning object-detection model; or
adapting the augmented LIDAR capture to generate an adapted LIDAR capture and training the machine-learning object-detection model using the adapted LIDAR capture.

28. The method of claim 26, wherein:
the method further comprises obtaining a model of the object;
obtaining the first LIDAR-based representation of the object comprises simulating a LIDAR capture of the model of the object from the first distance and from the first viewing angle; and
obtaining the third LIDAR-based representation of the object comprises simulating a LIDAR capture of the model of the object from the first distance and from the second viewing angle.

29. A non-transitory computer-readable storage medium having stored thereon instructions that, when executed by at least one processor, cause the at least one processor to:
obtain a light detection and ranging (LIDAR) capture, wherein the LIDAR capture comprises a first three-dimensional (3D) point cloud that represents an environment;
obtain a first LIDAR-based representation of an object as captured from a first distance, wherein the first LIDAR-based representation of the object comprises a first 3D point cloud that represents the object;
obtain a second LIDAR-based representation of the object as captured from a second distance, wherein the second LIDAR-based representation of the object comprises a second 3D point cloud that represents the object;
augment the LIDAR capture using the first LIDAR-based representation of the object and the second LIDAR-based representation of the object to generate an augmented LIDAR capture, wherein the augmented LIDAR capture comprises a second 3D point cloud that represents the environment; and
train a machine-learning object-detection model using the augmented LIDAR capture.

30. The non-transitory computer-readable storage medium of claim 29, wherein to augment the LIDAR capture, the instructions, when executed by the at least one processor, cause the at least one processor to add the first LIDAR-based representation of the object and the second LIDAR-based representation of the object into the LIDAR capture.

* * * * *